(12) United States Patent
Baek et al.

(10) Patent No.: US 12,628,078 B2
(45) Date of Patent: May 12, 2026

(54) METHOD AND APPARATUS FOR UE INFORMATION DELIVERY FOR NETWORK ENERGY SAVING

(71) Applicant: Samsung Electronics Co., Ltd., Suwon-si (KR)

(72) Inventors: Sangkyu Baek, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 18/325,577

(22) Filed: May 30, 2023

(65) Prior Publication Data

US 2023/0388923 A1 Nov. 30, 2023

(30) Foreign Application Priority Data

May 30, 2022 (KR) ........................ 10-2022-0065758

(51) Int. Cl.
*H04W 52/02* (2009.01)

(52) U.S. Cl.
CPC .............................. *H04W 52/0206* (2013.01)

(58) Field of Classification Search
CPC ............. H04W 52/0206; H04W 72/21; H04W 52/0216; H04W 52/0229
See application file for complete search history.

(56) References Cited

U.S. PATENT DOCUMENTS

2020/0154354 A1 5/2020 Awoniyi-Oteri et al.
2022/0077995 A1* 3/2022 Yang ..................... H04L 5/0087

FOREIGN PATENT DOCUMENTS

CN 112118617 A 12/2020
CN 114521005 A 5/2022
EP 4637224 A2 * 10/2025 .......... H04W 68/005
WO 2022145964 A1 7/2022

OTHER PUBLICATIONS

CMCC (Moderator), "New WID on further enhancement of data collection for SON (Self Organising Networks)/MDT (Minimization of Drive Tests) in NR and EN DC," RP-213553 (In revision of RP-212720), 3GPP TSG RAN Meeting #94e, Electronic Meeting, Dec. 6-17, 2021, 5 pages.
Supplementary European Search Report dated Jun. 20, 2025, in connection with European Application No. 23816329.9, 13 pages.
Moderator (Intel Corporation), "Discussion Summary for energy saving techniques of NW energy," R1-2205140, 3GPP TSG RAN WG1 Meeting #109-e, e-Meeting, May 9-20, 2022, 20 pages.
(Continued)

*Primary Examiner* — Gbemileke J Onamuti

(57) ABSTRACT

A method performed by a terminal in a wireless communication system. The method includes receiving, from a base station, a first message associated with triggering a transmission of a second message, identifying whether the transmission of the second message associated with network energy saving is triggered based on the first message, transmitting, to the base station, the second message associated with network energy saving, in case that the transmission of the second message is triggered, and receiving, from the base station, a third message associated with a network energy status of the base station configured based on the second message.

20 Claims, 20 Drawing Sheets

(56)　　　　　　References Cited

OTHER PUBLICATIONS

NEC, "Discussion on network energy saving techniques," R1-2203936, 3GPP TSG RAN WG1 #109-e, e-Meeting, May 9-20, 2022, 5 pages.

International Search Report and Written Opinion of the International Searching Authority dated Sep. 7, 2023, in connection with International Application No. PCT/KR2023/007362, 7 pages.

Moderator (Intel Corporation), "Summary #3 for email discussion on energy saving techniques of NW energy saving SI," R1-2205554, 3GPP TSG RAN WG1 Meeting #109-e, e-Meeting, May 9-20, 2022, 150 pages.

Samsung, "Network energy saving techniques," R1-2203920, 3GPP TSG RAN WG1 #109-e, e-Meeting, May 9-20, 2022, 8 pages.

* cited by examiner

FIG. 18

| Required Data Rate |
| --- |

2010 2020 2030

METHOD AND APPARATUS FOR UE INFORMATION DELIVERY FOR NETWORK ENERGY SAVING

CROSS-REFERENCE TO RELATED APPLICATION

This application is based on and claims priority under 35 U.S.C. 119 to Korean Patent Application No. 10-2022-0065758, filed on May 30, 2022, in the Korean Intellectual Property Office, the disclosure of which is herein incorporated by reference in its entirety.

BACKGROUND

1. Field

The disclosure relates to operations of a terminal and a base station in a mobile communication system. More specifically, the disclosure provides a method and an apparatus for improving power consumption of a base station (or network).

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The disclosure provides a method for improving power consumption of a base station (or network) and an apparatus therefor.

Specifically, the disclosure provides a method for transferring, by a terminal, information used for improvement of power consumption of a base station.

In addition, the disclosure provides a method for managing power of a base station by considering data volume of a terminal, expected data volume of a terminal, an expected data transmission rate, an arrival status of data transmitted from the terminal, and the like.

In accordance with an aspect of the disclosure, a method performed by a terminal in a wireless communication system is provided. The method includes receiving, from a base station, a first message associated with triggering a transmission of a second message, identifying whether the transmission of the second message associated with network energy saving is triggered based on the first message, transmitting, to the base station, the second message associated with network energy saving, in case that the transmission of the second message is triggered, and receiving, from the base station, a third message associated with a network energy status of the base station configured based on the second message.

In accordance with another aspect of the disclosure, a method performed by a base station in a wireless communication system is provided. The method includes transmitting, to a terminal, a first message associated with triggering a transmission of a second message, receiving, from the terminal, the second message associated with network energy saving, in case that the transmission of the second message is triggered based on the first message, controlling a network energy status of the base station based on the second message, and transmitting, to the terminal, a third message associated with the network energy status.

In accordance with another aspect of the disclosure, a terminal in a wireless communication system is provided. The terminal includes a transceiver and a controller coupled with the transceiver and configured to receive, from a base station, a first message associated with triggering a transmission of a second message, identify whether the transmission of the second message associated with network energy saving is triggered based on the first message, transmit, to the base station, the second message associated with network energy saving, in case that the transmission of the second message is triggered, and receive, from the base station, a third message associated with a network energy status of the base station configured based on the second message.

In accordance with another aspect of the disclosure, a base station in a wireless communication system is provided. The base station includes a transceiver, and a controller coupled with the transceiver and configured to transmit, to a terminal, a first message associated with triggering a transmission of a second message, receive, from the terminal, the second message associated with network energy saving, in case that the transmission of the second message is triggered based on the first message, control a network energy status of the base station based on the second message, and transmit, to the terminal, a third message associated with the network energy status.

The technical problems to be achieved in the embodiment of the disclosure are not limited to the technical problems mentioned above, and other technical problems not mentioned herein will be clearly understood from the following description by those skilled in the art to which the disclosure belongs.

According to an embodiment of the disclosure, power consumption of a base station may be reduced.

In addition, according to an embodiment of the disclosure, a terminal may transfer information used for managing power consumption of a base station, and the base station may manage power consumption of the base station based on information received from the terminal.

In addition, according to an embodiment of the disclosure, a terminal may determine a triggering condition for transmission of information used for managing power consumption of a base station, and may transmit the corresponding information according to the triggering condition.

In addition, according to an embodiment of the disclosure, power consumption of a terminal may be reduced according to a power reduction operation of a base station.

Effects that can be obtained in the disclosure are not limited to the above-described effects, and other unmentioned effects will be able to be clearly understood by those of ordinary skill in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 18 illustrates a format of a request data rate report message of a UE according to an embodiment of the disclosure;

DETAILED DESCRIPTION

Figure 1:
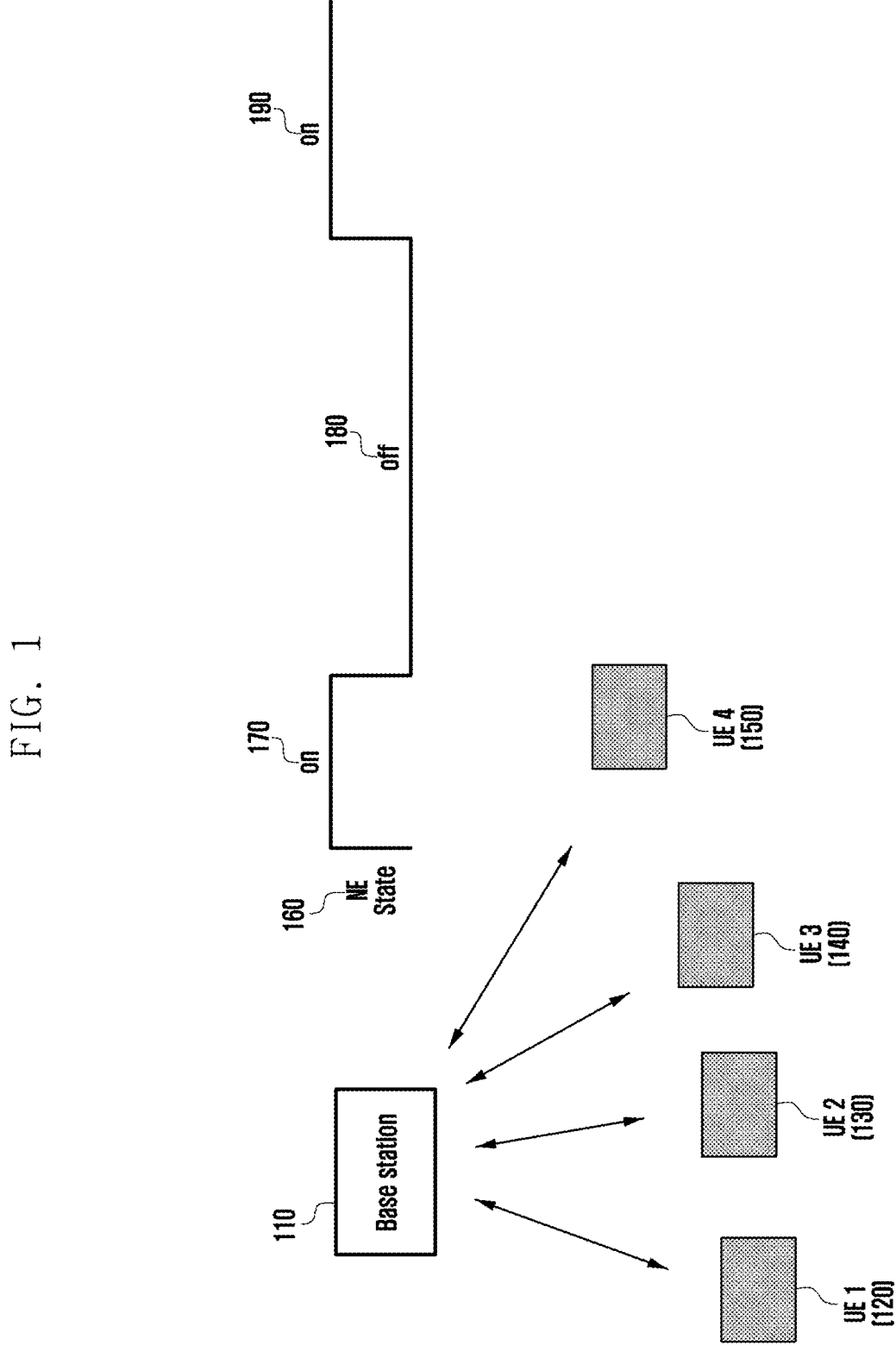
FIG. 1 illustrates a method for reducing network power consumption in a mobile communication system according to an embodiment of the disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose and inform those skilled in the art of the scope of the disclosure, and the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed concurrently or the blocks may sometimes be executed in the reverse order, depending upon the functionality involved.

As used herein, "unit" refers to a software element or a hardware element, such as a field programmable gate array (FPGA) or an application specific integrated circuit (ASIC), which performs a predetermined function. However, the term "unit" does not always have a meaning limited to software or hardware. "Unit" may be constructed either to be stored in an addressable storage medium or to execute one or more processors. Therefore, "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may either be combined into a smaller number of elements, or a "unit", or divided into a larger number of elements, or a "unit". Moreover, the elements and "units" may be implemented to reproduce one or more CPUs within a device or a security multimedia card. Further, the term "unit" in the embodiments may include one or more processors.

Embodiments of the disclosure are described with reference to the accompanying drawings. In describing embodiments, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly convey the main idea. The terms which will be described below are terms defined in consideration of the functions in the disclosure, and may be different according to users, intentions of the users, or customs. Therefore, the definitions of the terms should be made based on the contents throughout the specification.

In the following description, a BS is an entity that allocates resources to terminals, and may be at least one of a gNode B, an eNode B, a Node B, a BS, a wireless access unit, a BS controller, and a node on a network. A terminal may include a UE, a mobile station (MS), a cellular phone, a smartphone, a computer, or a multimedia system capable of performing communication functions. But, it is not limited to the above examples.

FIG. 1 illustrates a method for reducing network power consumption in a mobile communication system according to an embodiment of the disclosure.

In a mobile communication system, a base station 110 provides a communication service to multiple UEs 120, 130, 140, and 150. Here, the UE may be in a connected mode (RRC_CONNECTED mode) in which a radio resource control (RRC) connection is established, or in an inactive mode (RRC_INACTIVE mode) or an idle mode (RRC_IDLE mode) in which an RRC connection is released. UEs in various RRC modes may be located in the coverage of one base station, and the base station should provide communication services to these multiple UEs. Therefore, the base station has relatively high power consumption compared to the UE. In addition, 5th generation (5G) mobile communication requiring high-speed transmission should have a higher bandwidth, a higher transmission signal strength, and a higher reception sensitivity to perform high-speed transmission, and thus this leads to high power consumption. Since the number of base stations managed by one mobile communication operator ranges from tens of thousands to hundreds of thousands of base stations, high power consumption of a communication network including a base station may increase management and maintenance costs of the mobile communication network. Therefore, a method for reducing power consumption of a communication network is required.

Reducing the power consumption of the communication network may be achieved by a base station temporarily cutting off power to a transceiver. This is possible when the base station does not communicate with a UE to which a communication service should be provided. In the embodiment of FIG. 1, the state indicating whether the base station cuts off power to the transceiver is represented as a network energy (NE) state (indicated by reference numeral 160). In case that the NE state of the base station is ON (indicated by reference numeral 170), the base station may perform a procedure used for transmission to and reception from the UE while the power of the transceiver is turned on. For example, the base station may indicate resource allocation information via a physical downlink control channel (PDCCH) and perform data transmission via a physical downlink shared channel (PDSCH) in order to allocate downlink resources to the UE. However, when the base station has little or no data to transmit to and receive from the UE, the base station may switch the NE state to OFF (indicated by reference numeral 180) and cut off power to the transceiver. Here, in case that the UE knows the NE state of the base station, the UE may also cut off power to the transceiver of the UE to reduce power consumption and not perform an unnecessary communication procedure. The transition of the NE state of the base station may occur during a predetermined period of time or may be changed by separate control information. In the embodiment of FIG. 1, switching back to the ON state 190 again after a configured OFF-state period of time 180 is discussed. For example, a timer may be started after a state transition from ON to OFF, and when the timer expires, the NE state of the base station may be switched back to the ON state.

The operation of reducing power consumption of a communication network by switching the base station to the NE OFF state may be performed by the base station itself as needed without assistance from the UE. However, when the UE transmits assistance information for determining the NE state to the base station, the base station may effectively reduce power consumption. For example, in case that a UE desiring to communicate with a base station requests a high data transmission rate, the base station may maintain the NE state in an ON state to continuously perform high-speed data transmission to the UE. To this end, the UE may perform, based on at least one information of the data volume of the UE, the expected data volume of the UE, the expected data transmission rate, or the data arrival status, an operation of transmitting the corresponding content to the base station. In addition, in case that the base station switches the NE state to OFF, the UE may also perform an operation of reducing power consumption. As such, a mode in which the NE state of the base station is directly or indirectly transmitted to the UE or the UE transmits a message used for determining the NE state of the base station may be referred to as a network energy saving (NES) mode.

Figure 2:
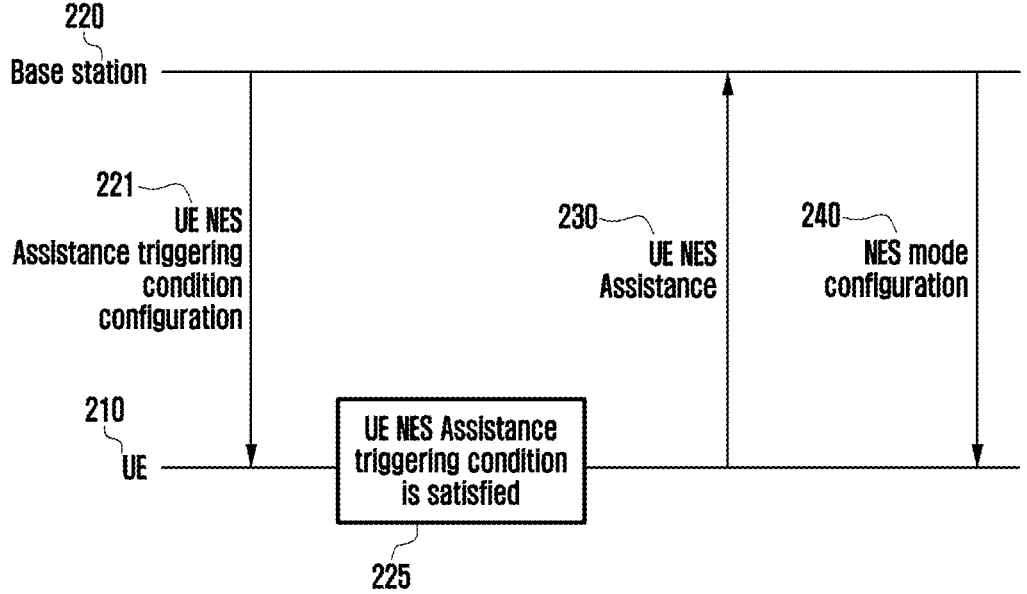
FIG. 2 illustrates an operation of a user equipment (UE) for transmitting a UE network energy saving (NES) Assistance message according to an embodiment of the disclosure.

FIG. 2 illustrates an operation of a UE for transmitting a UE NES Assistance message according to an embodiment of the disclosure.

In an NES mode, when a UE 210 transmits assistance information for determining the NE state to a base station 220, the base station may effectively reduce power consumption. In this disclosure, this assistance information will be expressed as a user equipment (UE) NES Assistance message. However, the use of these terms does not limit the technical scope of the disclosure.

In order for the UE to transmit the UE NES Assistance message to the base station, the base station needs to configure conditions regarding when transmission of the UE NES Assistance message is triggered to the UE. To this end, in operation 221, the base station may transmit a UE NES Assistance triggering condition configuration message (e.g., first message) to the UE. The UE NES Assistance triggering condition configuration message may be configured with at least one of a unit for triggering a UE NES Assistance message, a triggering condition, a threshold related to a triggering condition, and a period in which the UE NES Assistance message is transmitted. For example, the UE NES Assistance triggering condition configuration message of operation 221 may be included in a network energy saving (NES) mode configuration message transmitted from the base station to the UE and then transmitted.

Upon receiving the UE NES Assistance triggering condition configuration message, the UE 210 may identify whether the UE NES Assistance triggering condition is satisfied in operation 225. The UE NES Assistance triggering condition may be configured based on at least one of embodiments to be described later in FIGS. 5 to 15.

In case that, in operation 225, the UE determines that the triggering condition of the UE NES Assistance message is satisfied, the UE may transmit the UE NES Assistance message (e.g., second message) to the base station in operation 230. Here, the UE NES Assistance message may include at least one of the data volume of a UE, the expected data volume of the UE, the expected data transmission rate, and the data arrival status. In an embodiment, a corresponding condition indicating a UE NES Assistance triggering condition satisfied may be included in the UE NES Assistance message. In an embodiment, the UE NES Assistance message may be configured in the format of a buffer status report message transmitted from the UE to the base station. In this case, the triggering condition of the UE NES Assistance message may correspond to one of the triggering conditions of the buffer status report message.

The base station may receive the UE NES Assistance message transmitted by the UE, and then may configure or change the NE state of the base station based on information included in the message. In operation 240, the base station having configured or changed the NE state may be configured to transmit an NES mode configuration message (e.g., third message) to the UE and share the NE state of the base station with the UE, and may be configured to enable the UE to perform a UE operation corresponding to a case in which the NE state of the base station is OFF.

Figure 3:
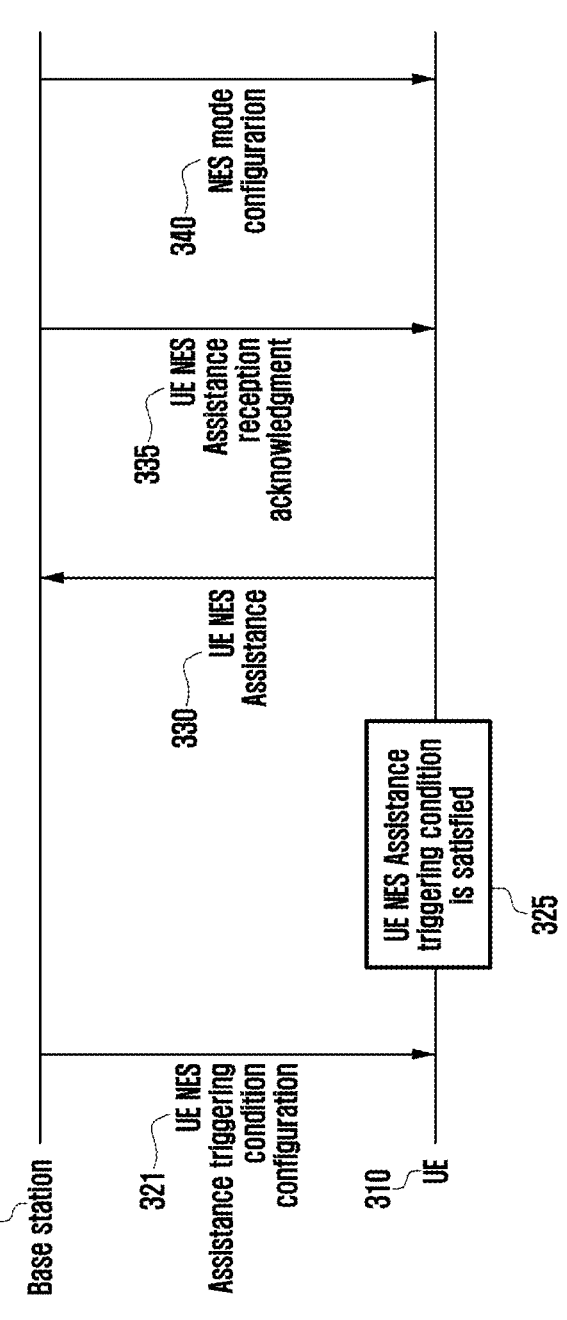
FIG. 3 illustrates an operation of a UE for transmitting a UE NES Assistance message according to an embodiment of the disclosure.

FIG. 3 illustrates an operation of a UE for transmitting a UE NES Assistance message according to an embodiment of the disclosure.

In an NES mode, when a UE 310 transmits assistance information for determining an NE state to a base station 320, the base station may effectively reduce power consumption. In this disclosure, this assistance information will be expressed as a user equipment (UE) NES Assistance message. However, the use of these terms does not limit the technical scope of the disclosure.

In order for the UE to transmit the UE NES Assistance message, the base station needs to configure conditions regarding when the UE NES Assistance message is triggered and transmitted to the UE. To this end, in operation 321, the base station may transmit a UE NES Assistance triggering condition configuration message (e.g., first message) to the UE. The UE NES Assistance triggering condition configuration message may be configured with at least one of a unit for triggering a UE NES Assistance message (e.g., second message), a triggering condition, a threshold related to a triggering condition, and a period in which the UE NES Assistance message is transmitted. In an embodiment, the UE NES Assistance triggering condition configuration message in operation 321 may be included in a network energy saving mode (NES mode) configuration message, which is transmitted to the UE by the base station, and transmitted.

In operation 325, upon receiving the UE NES Assistance triggering condition configuration message, the UE 310 may identify whether the UE NES Assistance triggering condition is satisfied. The UE NES Assistance triggering condition may be configured to at least one of embodiments to be described later in FIGS. 5 to 15.

In case that the UE determines that the triggering condition of the UE NES Assistance message is satisfied in operation 325, the UE may transmit the UE NES Assistance message (e.g., second message) to the base station in operation 330. Here, the UE NES Assistance message may include at least one of the data volume of the UE, the expected data volume of the UE, the expected data transmission rate, and the data arrival status. In an embodiment, a corresponding condition indicating a UE NES Assistance triggering condition satisfied may be included in the UE NES Assistance message. In an embodiment, the UE NES Assistance message may be configured in the format of a buffer status report message transmitted from the UE to the base station. In this case, the triggering condition of the UE NES Assistance message may correspond to one of the triggering conditions of the buffer status report message.

In operation 335, the base station may receive the UE NES Assistance message, having been transmitted by the UE, and then may transmit, to the UE, a UE NES Assistance acknowledgment message notifying that the UE NES Assistance message has been successfully received. The UE NES Assistance acknowledgment message may include information indicating that the base station changes the NE state to the OFF state to reduce power consumption.

After having received the UE NES Assistance acknowledgment message, the UE may perform an operation accordingly. For example, the UE that has received the UE NES Assistance acknowledgment message may perform an operation assuming that the base station is switched to the NE Off state.

The base station may configure or change the NE state of the base station based on information included in the UE NES Assistance message of the UE. In operation 340, the base station having configured or changed the NE state may be configured to transmit an NES mode configuration message (e.g., third message) to the UE and share the NE state of the base station with the UE, and may be configured to enable the UE to perform a UE operation corresponding to a case in which the NE state of the base station is OFF.

Figure 4:
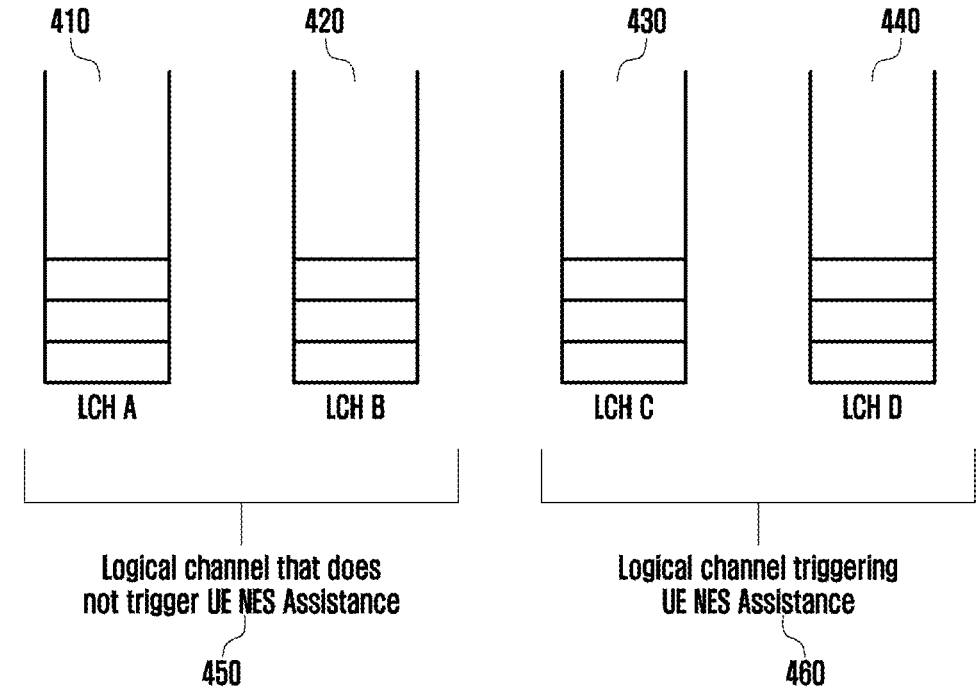
FIG. 4 illustrates a logical channel configuration method of a UE for triggering a UE NES Assistance message according to an embodiment of the disclosure.

FIG. 4 illustrates a logical channel configuration method of a UE for triggering a UE NES Assistance message according to an embodiment of the disclosure.

As described in FIGS. 2 and 3, transmission of the UE NES Assistance message may be triggered when a UE satisfies a configured condition due to the configuration of a base station. To this end, a list of logical channels triggering the UE NES Assistance message may be separately configured. Specifically, some or all of the logical channels configured for the UE may be configured as logical channels triggering the UE NES Assistance message. These logical channels may be included in a logical channel configuration of the UE and may be transmitted by the base station to the UE.

In the embodiment of FIG. 4, it has been assumed that four logical channels including a logical channel A (LCH A) 410, a logical channel B (LCH B) 420, a logical channel C (LCH C) 430, and a logical channel D (LCH D) 440 are configured. It is assumed that the logical channel A 410 and logical channel B 420 thereof have been configured as a logical channel 450 that does not trigger UE NES Assistance, and the logical channel C 430 and the logical channel D 440 have been configured as a logical channel 460 triggering UE NES Assistance. Based on this information, at the time of triggering a UE NES Assistance message to be described later from FIGS. 5 to 15, the UE NES Assistance message may be triggered by identifying whether the logical channel triggering the UE NES Assistance satisfies the triggering condition of the UE NES Assistance message.

FIG. 4 illustrates a method for configuring a logical channel for triggering UE NES Assistance among logical channels configured in a medium access control (MAC) layer. However, in an embodiment, a radio bearer triggering UE NES Assistance among radio bearers configured for a UE may be established. In this case, a radio bearer other than a radio bearer that triggers UE NES Assistance may be a radio bearer that does not trigger UE NES Assistance. Based on this information, at the time of triggering a UE NES Assistance message to be described later from FIGS. 5 to 15, the UE NES Assistance message may be triggered by identifying whether a radio bearer triggering the UE NES Assistance message satisfies the triggering condition of the UE NES Assistance message. The radio bearer triggering the UE NES Assistance message may include at least one of a signaling radio bearer (SRB), a data radio bearer (DRB), a sidelink radio bearer (SLRB), or an MBS radio bearer (MRB).

Figure 5:
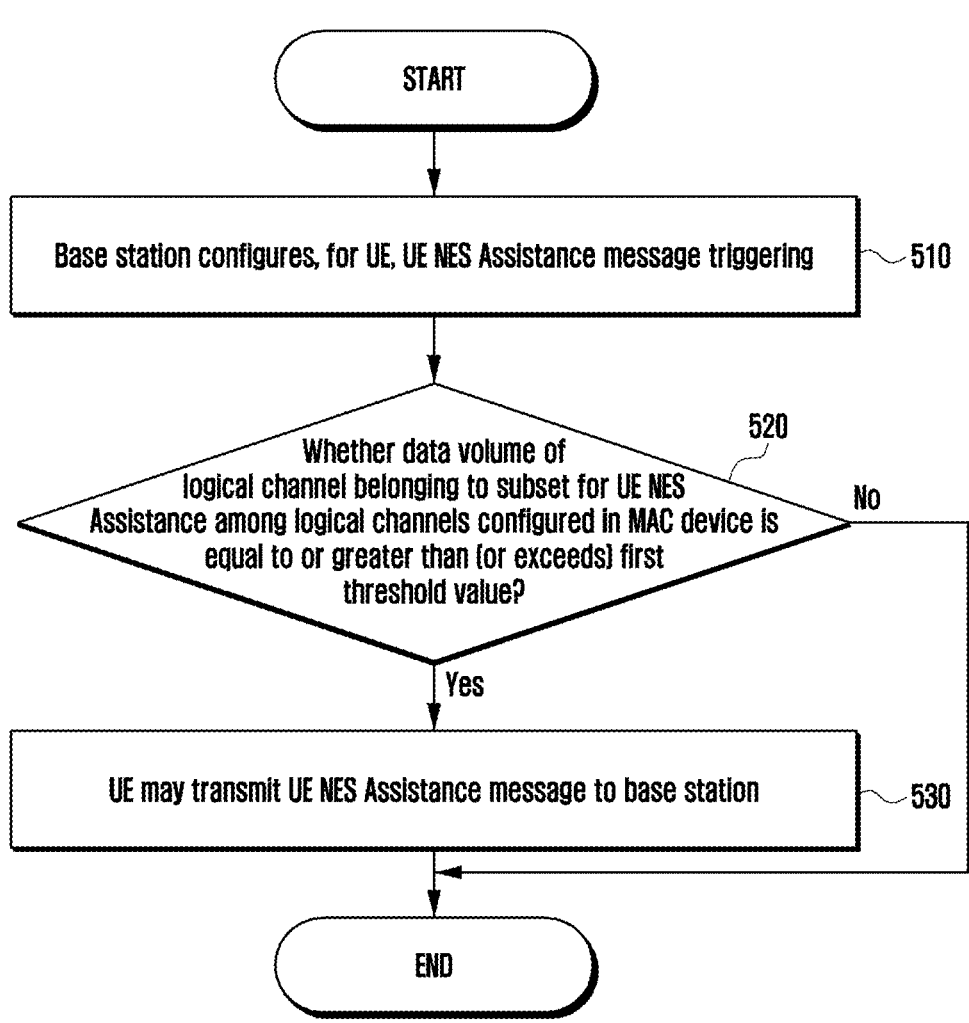
FIG. 5 illustrates an operation of a UE for triggering a UE NES Assistance message according to an embodiment of the disclosure.

FIG. 5 illustrates an operation of a UE for triggering a UE NES Assistance message according to an embodiment of the disclosure.

In the embodiment of FIG. 5, a method for triggering a UE NES Assistance message by a UE using a data volume of a MAC device is discussed. In an embodiment, the data volume calculated by the MAC device of the UE may imply a value indicating the quantity of data to be transmitted by the UE to a base station through uplink. In another embodiment, the UE may trigger the UE NES Assistance message using a data volume value of a packet data convergence protocol (PDCP) layer rather than the data volume of the MAC device.

Referring to FIG. 5, it may be assumed that the base station configures, for the UE, UE NES Assistance message triggering in operation 510. Operation 510 of FIG. 5 may be understood as performing operation 221 of FIG. 2 or operation 321 of FIG. 3 in which the base station transmits a UE NES Assistance triggering condition configuration message to the UE. When the triggering condition of the UE NES Assistance message is configured, logical channel information for triggering the UE NES Assistance message (in another embodiment, radio bearer information for triggering the UE NES Assistance message) and/or a first threshold of data volume may be configured.

In operation 520, the UE may identify whether the data volume of a logical channel triggering UE NES Assistance (a logical channel belonging to a subset for UE NES Assistance) among logical channels configured in the MAC device is equal to or greater than a first threshold value (or exceeds a first threshold value in an embodiment). In another embodiment, the condition of operation 520 may correspond to identifying whether the data volume of a radio bearer (a radio bearer belonging to a subset for UE NES Assistance) triggering UE NES Assistance among radio bearers (part or all of DRB, SRB, SLRB, and MRB) configured in the UE is equal to or greater than a first threshold (or exceeds a first threshold value in an embodiment).

In case that the condition of operation 520 is satisfied, the UE may transmit a UE NES Assistance message to the base station in operation 530. In case that the data volume of the UE exceeds a predetermined amount, the base station may provide a communication service to the UE instead of reducing power consumption. To this end, the UE NES Assistance message may include information on the data volume of the UE. In an embodiment, the UE NES Assistance message may be a buffer status report message. In this case, satisfying the condition of operation 520 may result in a condition for triggering a buffer status report message. Here, the buffer status report may be a type of regular buffer status report. The data volume included in the UE NES Assistance may correspond to the total amount of valid data possessed by the UE and to be transmitted to the base station and may be referred to as a buffer size.

Figure 6:
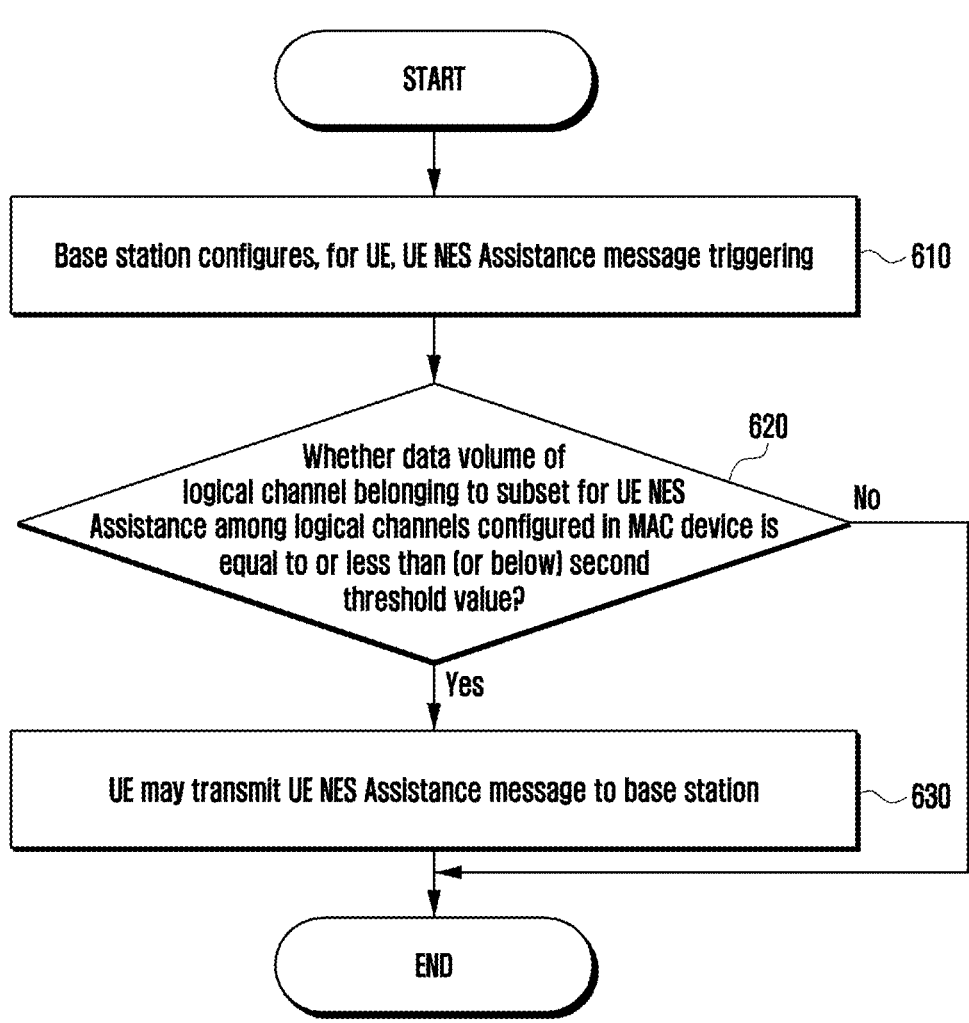
FIG. 6 illustrates an operation of a UE for triggering a UE NES Assistance message according to an embodiment of the disclosure.

FIG. 6 illustrates an operation of a UE for triggering a UE NES Assistance message according to an embodiment of the disclosure.

In the embodiment of FIG. 6, a method for triggering a UE NES Assistance message by a UE using a data volume of a MAC device is discussed. In an embodiment, the data volume calculated by the MAC device of the UE may imply a value indicating the quantity of data to be transmitted by the UE to a base station through uplink. In another embodiment, the UE may trigger the UE NES Assistance message using a data volume value of a packet data convergence protocol (PDCP) layer rather than the data volume of the MAC device.

Referring to FIG. 6, it may be assumed that the base station configures, for the UE, UE NES Assistance message triggering in operation 610. Operation 610 of FIG. 6 may be understood as performing operation 221 of FIG. 2 or operation 321 of FIG. 3 in which the base station transmits a UE NES Assistance triggering condition configuration message to the UE. When the triggering condition of the UE NES Assistance message is configured, logical channel information for triggering the UE NES Assistance message (in another embodiment, radio bearer information for triggering the UE NES Assistance message) and/or a second threshold of data volume may be configured.

In operation 620, the UE may identify whether the data volume of a logical channel triggering UE NES Assistance (a logical channel belonging to a subset for UE NES Assistance) among logical channels configured in the MAC device is equal to or less than a second threshold value (or below a second threshold value in an embodiment). In another embodiment, the condition of operation 620 may correspond to identifying whether the data volume of a radio bearer (a radio bearer belonging to a subset for UE NES Assistance) triggering UE NES Assistance among radio bearers (part or all of DRB, SRB, SLRB, and MRB) configured in the UE is equal to or less than a second threshold (or below a second threshold value in an embodiment).

In case that the condition of operation 620 is satisfied, the UE may transmit a UE NES Assistance message to the base station in operation 630. In case that the data volume of the UE does not exceed a predetermined amount, the base station may switch the NE state to OFF state to reduce power consumption. To this end, the UE NES Assistance message may include information about the data volume of the UE. In an embodiment, the UE NES Assistance message may be a buffer status report message. In this case, satisfying the condition of operation 620 may result in a condition for triggering a buffer status report message. Here, the buffer status report may be a type of regular buffer status report. The data volume included in the UE NES Assistance may correspond to the total amount of valid data possessed by the UE and to be transmitted to the base station, and may be referred to as a buffer size.

Figure 7:
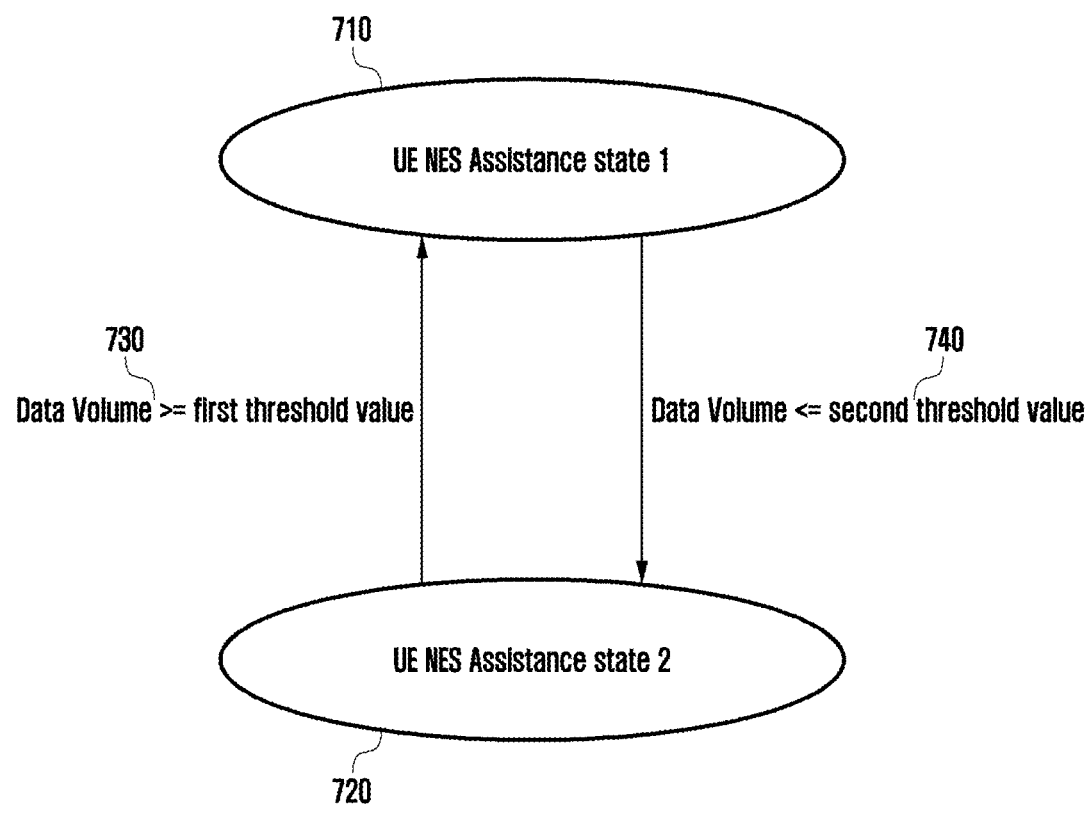
FIG. 7 illustrates an operation process of a UE NES Assistance state of a UE for triggering a UE NES Assistance message according to an embodiment of the disclosure.

FIG. 7 illustrates an operation process of a UE NES Assistance state of a UE for triggering a UE NES Assistance message according to an embodiment of the disclosure.

A UE may have multiple UE NES Assistance states. In FIG. 7, an example having two UE NES Assistance states is described for convenience of explanation. Referring to FIG. 7, the UE NES Assistance states may be divided into a first UE NES Assistance state 710 and a second UE NES Assistance state 720. The first UE NES Assistance state refers to a state in which a UE requests high-speed data transmission, and in this case, the base station is desirable to maintain the NES ON state. The second UE NES Assistance state refers to a state in which a UE does not request high-speed data transmission, and in this case, it may be expected that a short-term problem does not occur to the UE even if the base station maintains the NES OFF state.

For example, transmission of the NES UE Assistance message may occur when the UE NES Assistance state has changed. In another example, a UE NES Assistance message is periodically transmitted, and here, which state the UE NES Assistance state of the UE is in may be notified of through the UE NES Assistance message. In the second UE NES Assistance state of the UE, when the data volume of the MAC device or PDCP layer of the UE is equal to or greater than a first threshold value (or exceeds a first threshold value in an embodiment), the UE may transition to the first UE NES Assistance state (indicated by reference numeral 730). Here, transmission of a NES UE Assistance message is triggered, and the UE may transmit this triggered message to the base station. Conversely, in the first UE NES Assistance state of the UE, when the data volume of the MAC device or PDCP layer of the UE is equal to or less than the second threshold value, the UE may transition to the second NES Assistance state (indicated by reference numeral 740). Here, transmission of the NES UE Assistance message is triggered, and the UE may transmit this triggered message to the base station.

In an embodiment, the first threshold and the second threshold may be configured to be the same value, or, as in the embodiment of FIG. 7, the first threshold and the second threshold may be configured to be different values. For example, the first threshold may be configured to be a value equal to or smaller than the second threshold to adjust the frequency by which the UE NES Assistance state transitions.

In an embodiment, the condition of operation 730 may be referred to as a condition for entering the first UE NES Assistance state, and the condition of operation 740 may be referred to as a condition for leaving the first UE NES Assistance state. Conversely, the condition of operation 730 may be referred to as a condition for leaving the second UE NES Assistance state, and the condition of operation 740 may be referred to as a condition for entering the second UE NES Assistance state.

In an embodiment, the UE may transmit the UE NES Assistance message in the first UE NES Assistance state. In another embodiment, the UE may transmit the UE NES Assistance message in the second UE NES Assistance state.

Figure 8:
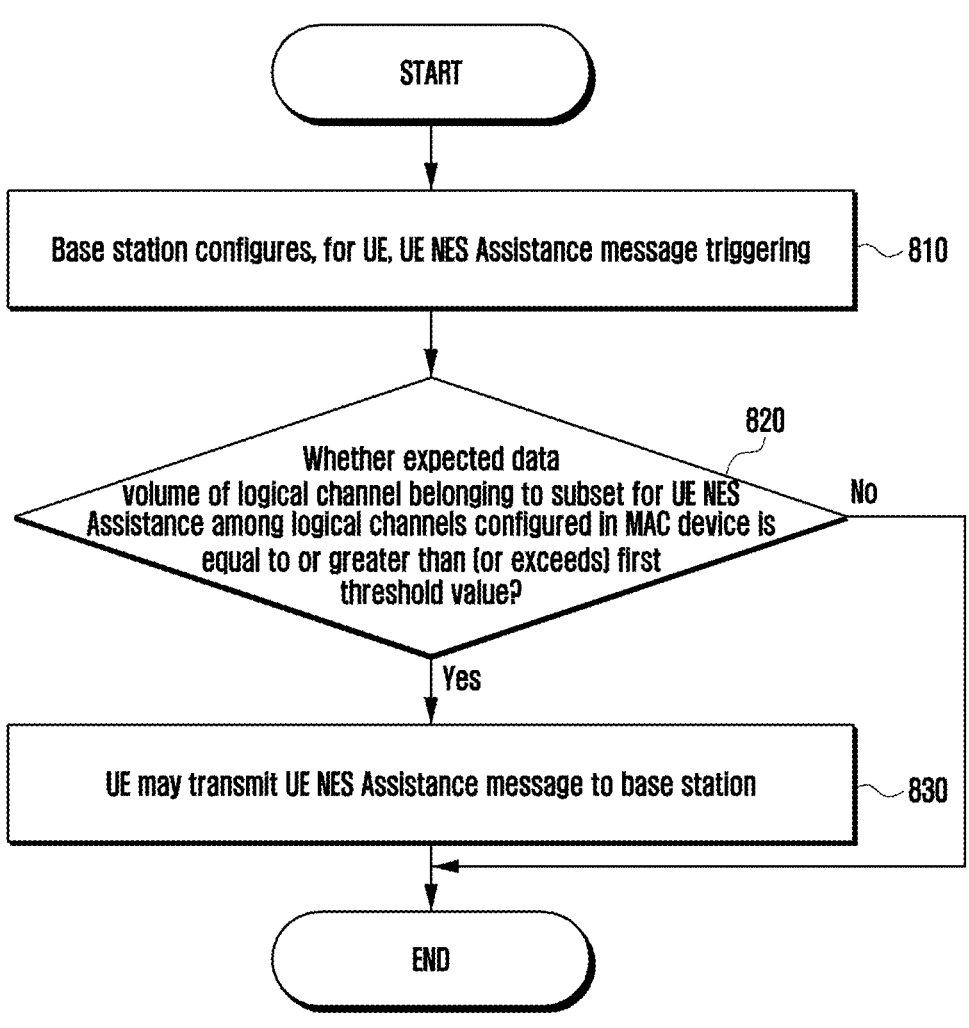
FIG. 8 illustrates an operation of a UE for triggering a UE NES Assistance message according to an embodiment of the disclosure.

FIG. 8 illustrates an operation of a UE for triggering a UE NES Assistance message according to an embodiment of the disclosure.

In the embodiment of FIG. 8, a method for triggering a UE NES Assistance message by a UE according to an expected data volume of a MAC device is discussed. In an embodiment, the data volume calculated by the MAC device of the UE may imply a value indicating the quantity of data to be transmitted by the UE to the base station through uplink. The UE may estimate the data volume expected to occur in a predetermined near future by using tasks performed by an application processor (AP) in the UE, traffic pattern analysis, machine learning, and the like, and may use this expected data volume for triggering of the UE NES Assistance message. In another embodiment, the UE may trigger the UE NES Assistance message using the expected data volume value of a packet data convergence protocol (PDCP) layer rather than the expected data volume of the MAC device.

Referring to FIG. 8, it may be assumed that the base station configures, for the UE, UE NES Assistance message triggering in operation 810. Operation 810 of FIG. 8 may be understood as performing operation 221 of FIG. 2 or operation 321 of FIG. 3 in which the base station transmits a UE NES Assistance triggering condition configuration message to the UE. When the triggering condition of the UE NES Assistance message is configured, logical channel information for triggering the UE NES Assistance message (in another embodiment, radio bearer information for triggering the UE NES Assistance message) and/or a first threshold of the expected data volume may be configured.

In operation 820, the UE may identify whether the expected data volume of a logical channel triggering UE NES Assistance (a logical channel belonging to a subset for UE NES Assistance) among logical channels configured in the MAC device is equal to or greater than a first threshold value (or exceeds a first threshold value in an embodiment). In another embodiment, the condition of operation 820 may correspond to identifying whether the expected data volume of a radio bearer (a radio bearer belonging to a subset for UE NES Assistance) triggering UE NES Assistance among radio bearers (part or all of DRB, SRB, SLRB, and MRB) configured in the UE is equal to or greater than a first threshold (or exceeds a first threshold value in an embodiment).

In case that the condition of operation 820 is satisfied, the UE may transmit a UE NES Assistance message to the base station in operation 830. In case that the expected data volume of the UE exceeds a predetermined amount, the base station may provide a communication service to the UE instead of reducing power consumption. To this end, the UE NES Assistance message may include information about the expected data volume of the UE. In an embodiment, the UE NES Assistance message may be configured in the format of a buffer status report message. However, a buffer size field included in this buffer status report message may include the data volume (buffer size) for each logical channel group expected to occur in a predetermined near future rather than the current buffer size for each logical channel group. The buffer status report message including the expected data volume may be referred to as an expected buffer status report. In this case, satisfying the condition of operation 820 may result in a condition for triggering the expected buffer status report message. The expected data volume included in the UE NES Assistance may correspond to the total amount of valid data that is expected to occur in a predetermined near future and possessed by the UE for transmission to the base station, and may be referred to as an expected buffer size.

In the embodiment of FIG. 8, a predetermined period of time for calculation of the expected data volume may be configured by the base station or may be pre-configured. Based on the expected data volume, the UE may transmit a UE NES Assistance message to the base station. In case that the UE NES Assistance message includes the expected data volume value, the UE may include a value, obtained by quantifying the expectation accuracy of the expected data volume of the UE, in the UE NES Assistance message, and the base station may operate the NES mode based on the expectation accuracy.

Figure 9:
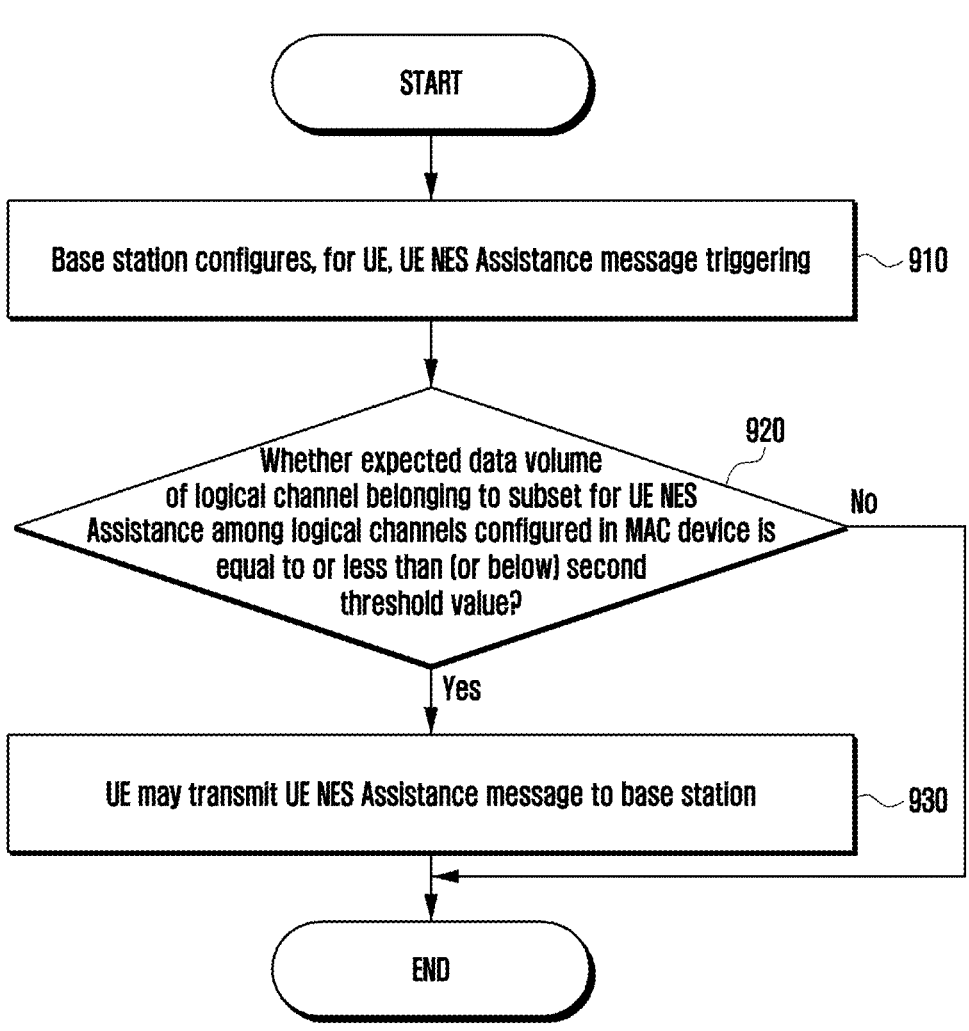
FIG. 9 illustrates an operation of a UE for triggering a UE NES Assistance message according to an embodiment of the disclosure.

FIG. 9 illustrates an operation of a UE for triggering a UE NES Assistance message according to an embodiment of the disclosure.

In the embodiment of FIG. 9, a method for triggering a UE NES Assistance message by a UE according to an expected data volume of a MAC device is discussed. In an embodiment, the data volume calculated by the MAC device of the UE may imply a value indicating the quantity of data to be transmitted by the UE to the base station through uplink. The UE may estimate the data volume expected to occur in a predetermined near future by using tasks performed by an application processor (AP) in the UE, traffic pattern analysis, machine learning, and the like, and may use this expected data volume for triggering of the UE NES Assistance message. In another embodiment, the UE may trigger the UE NES Assistance message using the expected data volume value of a packet data convergence protocol (PDCP) layer rather than the expected data volume of the MAC device.

Referring to FIG. 9, it may be assumed that the base station configures, for the UE, UE NES Assistance message triggering in operation 910. Operation 910 of FIG. 9 may be understood as performing operation 221 of FIG. 2 or operation 321 of FIG. 3 in which the base station transmits a UE NES Assistance triggering condition configuration message to the UE. When the triggering condition of the UE NES Assistance message is configured, logical channel information for triggering the UE NES Assistance message (in another embodiment, radio bearer information for triggering the UE NES Assistance message) and/or a second threshold of the expected data volume may be configured.

In operation 920, the UE may identify whether the expected data volume of a logical channel triggering UE NES Assistance (a logical channel belonging to a subset for UE NES Assistance) among logical channels configured in the MAC device is equal to or less than a second threshold value (or below a second threshold value in an embodiment). In another embodiment, the condition of operation 920 may correspond to identifying whether the expected data volume of a radio bearer (a radio bearer belonging to a subset for UE NES Assistance) triggering UE NES Assistance among radio bearers (part or all of DRB, SRB, SLRB, and MRB) configured in the UE is equal to or less than a second threshold (or below a second threshold value in an embodiment).

In case that the condition of operation 920 is satisfied, the UE may transmit a UE NES Assistance message to the base station in operation 930. In case that the expected data volume of the UE does not exceed a predetermined amount, the base station may switch the NE state to OFF state to reduce power consumption. To this end, the UE NES Assistance message may include information about the expected data volume of the UE. In an embodiment, the UE NES Assistance message may be configured in the format of a buffer status report message. However, a buffer size field included in this buffer status report message may include the data volume (buffer size) for each logical channel group expected to occur in a predetermined near future rather than the current buffer size for each logical channel group. The buffer status report message including the expected data volume may be referred to as an expected buffer status report. In this case, satisfying the condition of operation 920 may result in a condition for triggering the expected buffer status report message. The expected data volume included in the UE NES Assistance may correspond to the total amount of valid data that is expected to occur in a predetermined near future and possessed by the UE for transmission to the base station, and may be referred to as an expected buffer size.

In the embodiment of FIG. 9, a predetermined period of time for calculation of the expected data volume may be configured by the base station or may be pre-configured. Based on the expected data volume, the UE may transmit a UE NES Assistance message to the base station. In case that the UE NES Assistance message includes the expected data volume value, the UE may include a value, obtained by quantifying the expectation accuracy of the expected data volume of the UE, in the UE NES Assistance message, and the base station may operate the NES mode based on the expectation accuracy.

Figure 10:
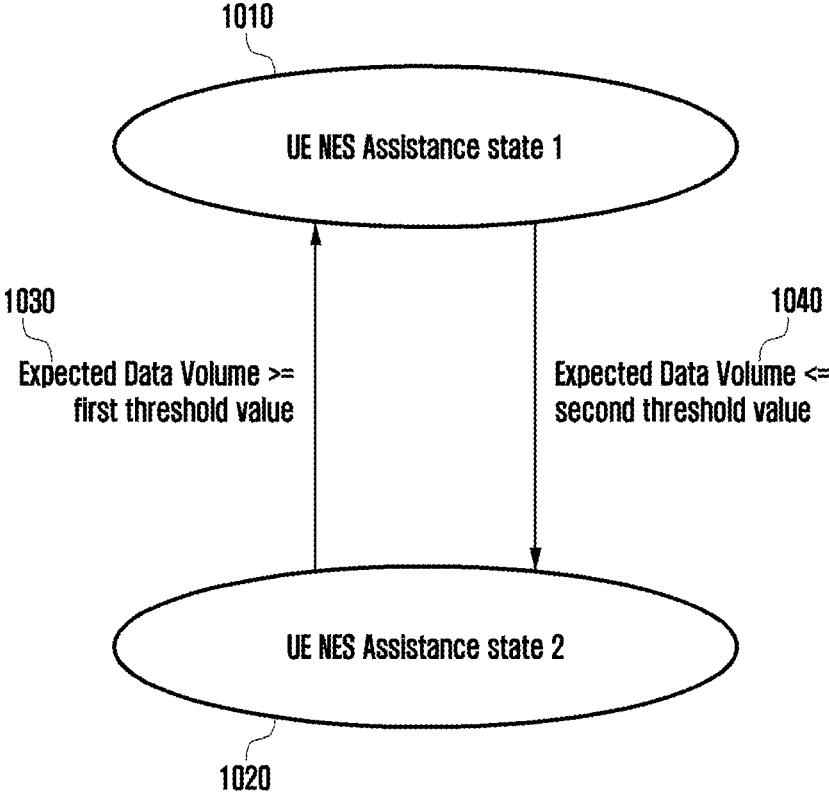
FIG. 10 illustrates an operation process of a UE NES Assistance state of a UE for triggering a UE NES Assistance message according to an embodiment of the disclosure.

FIG. 10 illustrates an operation process of a UE NES Assistance state of a UE for triggering a UE NES Assistance message according to an embodiment of the disclosure.

A UE may have multiple UE NES Assistance states. In FIG. 10, an example having two UE NES Assistance states is described for convenience of explanation. Referring to FIG. 10, the UE NES Assistance states may be divided into a first UE NES Assistance state 1010 and a second UE NES Assistance state 1020. The first UE NES Assistance state refers to a state in which a UE requests high-speed data transmission, and in this case, the base station is desirable to maintain the NES ON state. The second UE NES Assistance state refers to a state in which a UE does not request high-speed data transmission, and in this case, it may be expected that a short-term problem does not occur to the UE even if the base station maintains the NES OFF state. In an embodiment, transmission of the NES UE Assistance message may occur when the UE NES Assistance state has changed. For another example, a UE NES Assistance message is periodically transmitted, and here, which state the UE NES Assistance state of the UE is in may be notified of through the UE NES Assistance message. In the second UE NES Assistance state of the UE, when the data volume of the MAC device or PDCP layer of the UE is equal to or greater than a first threshold value (or exceeds a first threshold value in an embodiment), the UE may transition to the first UE NES Assistance state (indicated by reference numeral 1030). Here, a NES UE Assistance message is triggered, and the UE may transmit this triggered message to the base station. Conversely, in the first UE NES Assistance state of the UE, when the data volume of the MAC device or PDCP layer of the UE is equal to or less than the second threshold value (or below a second threshold value in an embodiment), the UE may transition to the second NES Assistance state (indicated by reference numeral 1040). Here, transmission of the NES UE Assistance message is triggered, and the UE may transmit this triggered message to the base station. In an embodiment, the first threshold and the second threshold may be configured to be the same value, or, as in the embodiment of FIG. 10, the first threshold and the second threshold may be configured to be different values. For example, the first threshold may be configured to be a value equal to or smaller than the second threshold to adjust the frequency by which the UE NES Assistance state transitions.

In an embodiment, the condition of operation 1030 may be referred to as a condition for entering the first UE NES Assistance state, and the condition of operation 1040 may be referred to as a condition for leaving the first UE NES Assistance state. Conversely, the condition of operation 1030 may be referred to as a condition for leaving the second UE NES Assistance state, and the condition of operation 1040 may be referred to as a condition for entering the second UE NES Assistance state.

In an embodiment, the UE may transmit the UE NES Assistance message in the first UE NES Assistance state. In another embodiment, the UE may transmit the UE NES Assistance message in the second UE NES Assistance state.

Figure 11:
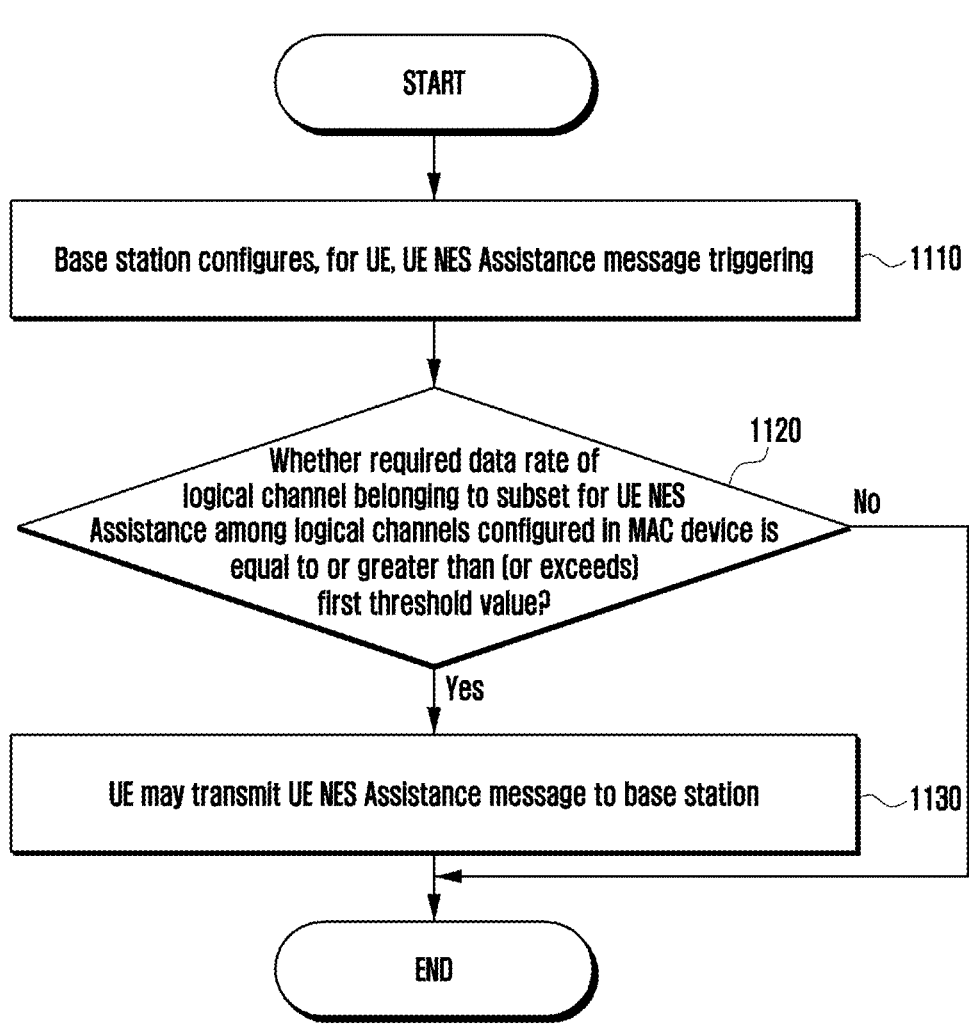
FIG. 11 illustrates an operation of a UE for triggering a UE NES Assistance message according to an embodiment of the disclosure.

FIG. 11 illustrates an operation of triggering a UE NES Assistance message of a UE according to an embodiment of the disclosure.

In the embodiment of FIG. 11, a method for triggering a UE NES Assistance message by a UE according to a required data rate of the UE is discussed. The UE may calculate a rate of uplink data (uplink data rate) that should be transmitted in a MAC device of the UE. The UE may estimate a required data rate in a predetermined near future by using tasks performed by an application processor (AP) in the UE, traffic pattern analysis, machine learning, and the like, and may use this required data rate for triggering of the UE NES Assistance message. However, in an embodiment, the UE may trigger the UE NES Assistance message using a data rate required by a PDCP layer or a specific layer rather than a data rate required by a MAC device.

Referring to FIG. 11, it may be assumed that the base station configures, for the UE, UE NES Assistance message triggering in operation 1110. Operation 1110 of FIG. 11 may be understood as performing operation 221 of FIG. 2 or operation 321 of FIG. 3 in which a base station transmits a UE NES Assistance triggering condition configuration message to the UE. When the triggering condition of the UE NES Assistance message is configured, logical channel information for triggering the UE NES Assistance message (in another embodiment, radio bearer information for triggering the UE NES Assistance message) and/or a first threshold of the required data rate may be configured.

In operation 1120, the UE may identify whether the required data rate of a logical channel triggering UE NES Assistance (a logical channel belonging to a subset for UE NES Assistance) among logical channels configured in the MAC device is equal to or greater than a first threshold value (or exceeds a first threshold value in an embodiment). In another embodiment, the condition of operation 1120 may correspond to identifying whether the required data rate of a radio bearer (a radio bearer belonging to a subset for UE NES Assistance) triggering UE NES Assistance among radio bearers (part or all of DRB, SRB, SLRB, and MRB) configured in the UE is equal to or greater than a first threshold (or exceeds a first threshold value in an embodiment).

In case that the condition of operation 1120 is satisfied, the UE may transmit a UE NES Assistance message to the base station in operation 1130. In case that the required data rate of the UE exceeds a predetermined amount, the base station may provide a communication service to the UE instead of reducing power consumption. To this end, the UE NES Assistance message may include information on a required data rate value of the UE. In an embodiment, the UE NES Assistance message may be configured in the format of a buffer status report message. However, a buffer size field included in this buffer status report message may include a data rate value required for each logical channel group rather than the current buffer size for each logical channel group. A message including the required data rate may be referred to as a required data rate report. In this case, satisfying the condition of operation 1120 may result in a condition for triggering the required data rate report message.

In the embodiment of FIG. 11, a predetermined period of time for calculation of the required data rate may be configured by the base station or may be pre-configured. Based on the required data rate of the UE, the UE may transmit a UE NES Assistance message to the base station. In case that the UE NES Assistance message includes the required data rate value, the UE may include a value, obtained by quantifying the accuracy of the required data rate of the UE, in the UE NES Assistance message, and the base station may operate the NES mode based on this accuracy.

Figure 12:
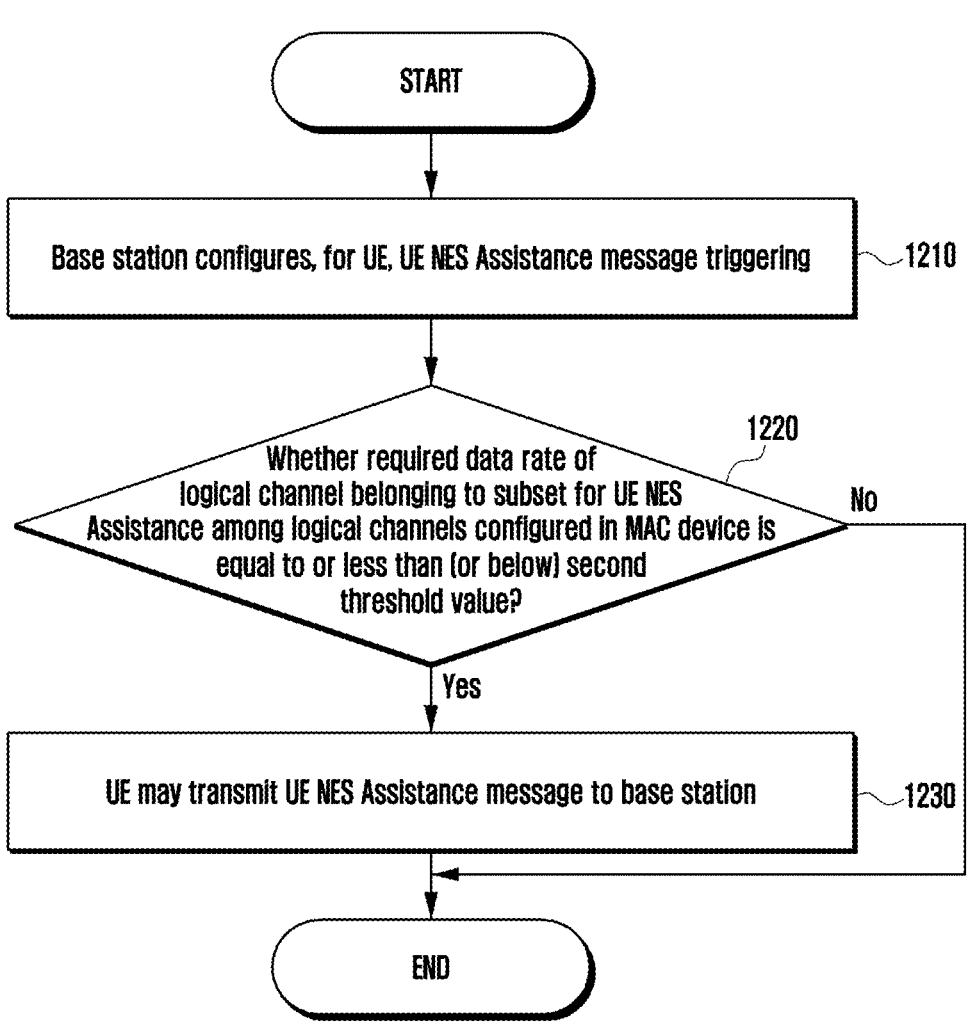
FIG. 12 illustrates an operation of a UE for triggering a UE NES Assistance message according to an embodiment of the disclosure.

FIG. 12 illustrates an operation of a UE for triggering a UE NES Assistance message according to an embodiment of the disclosure.

In the embodiment of FIG. 12, a method for triggering a UE NES Assistance message by a UE according to a required data rate of the UE is discussed. The UE may calculate a rate of uplink data (uplink data rate) that should be transmitted in a MAC device of the UE. The UE may estimate a required data rate in a predetermined near future by using tasks performed by an application processor (AP) in the UE, traffic pattern analysis, machine learning, and the like, and may use this required data rate for triggering of the UE NES Assistance message. However, in another embodiment, the UE may trigger the UE NES Assistance message using a data rate required by a PDCP layer or a specific layer rather than a data rate required by a MAC device.

Referring to FIG. 12, it may be assumed that the base station configures, for the UE, UE NES Assistance message triggering in operation 1210. Operation 1210 of FIG. 12 may be understood as performing operation 221 of FIG. 2 or operation 321 of FIG. 3 in which a base station transmits a UE NES Assistance triggering condition configuration message to the UE. When the triggering condition of the UE NES Assistance message is configured, logical channel information for triggering the UE NES Assistance message (in another embodiment, radio bearer information for triggering the UE NES Assistance message) and/or a second threshold of the required data rate may be configured.

In operation 1220, the UE may identify whether the required data rate of a logical channel triggering UE NES Assistance (a logical channel belonging to a subset for UE NES Assistance) among logical channels configured in the MAC device is equal to or less than a second threshold value (or below a second threshold value in an embodiment). In another embodiment, the condition of operation 1220 may correspond to identifying whether the required data rate of a radio bearer (a radio bearer belonging to a subset for UE NES Assistance) triggering UE NES Assistance among radio bearers (part or all of DRB, SRB, SLRB, and MRB) configured in the UE is equal to or less than a second threshold (or below a second threshold value in an embodiment).

In case that the condition of operation 1220 is satisfied, the UE may transmit a UE NES Assistance message to the base station in operation 1230. In case that the required data rate of the UE does not exceed a predetermined amount, the base station may switch the NE state to OFF state to reduce power consumption. To this end, the UE NES Assistance message may include information about a required data rate value of the UE. In an embodiment, the UE NES Assistance message may be configured in the format of a buffer status report message. However, a buffer size field included in this buffer status report message may include a data rate value required for each logical channel group rather than the current buffer size for each logical channel group. A message including the required data rate may be referred to as a required data rate report. In this case, satisfying the condition of operation 1220 may result in a condition for triggering the required data rate report message.

In the embodiment of FIG. 12, a predetermined period of time for calculation of the required data rate may be configured by the base station or may be pre-configured. The UE may transmit a UE NES Assistance message including the required data rate of the UE to the base station. In case that the UE NES Assistance message includes the required data rate value, the UE may include a value, obtained by quantifying the accuracy of the required data rate of the UE, in the UE NES Assistance message, and the base station may operate the NES mode based on this accuracy.

Figure 13:
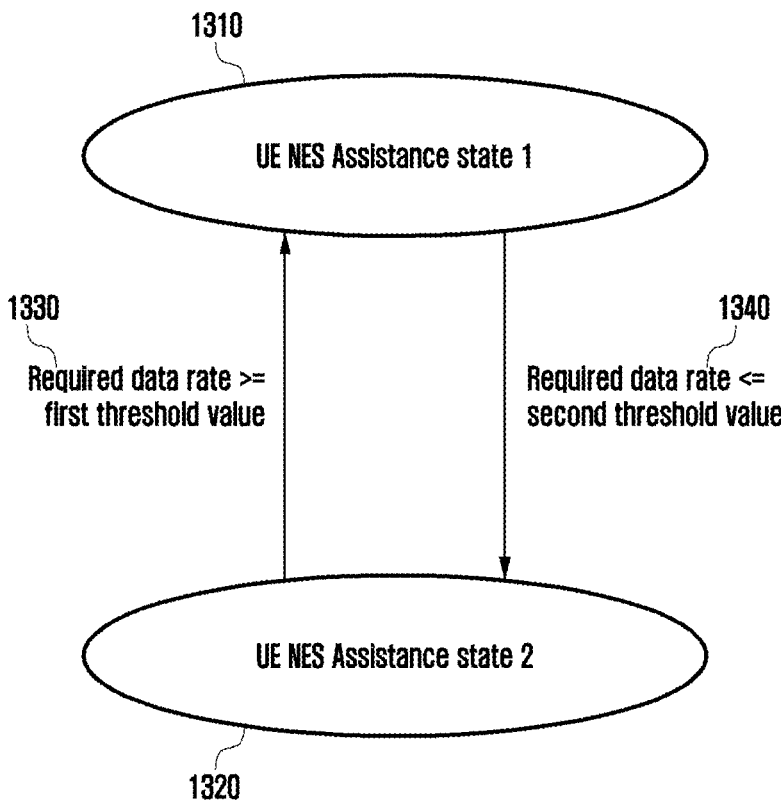
FIG. 13 illustrates an operation process of a UE NES Assistance state of a UE for triggering a UE NES Assistance message according to an embodiment of the disclosure.

FIG. 13 illustrates an operation process of a UE NES Assistance state of a UE for triggering a UE NES Assistance message according to an embodiment of the disclosure.

A UE may have multiple UE NES Assistance states. In FIG. 13, an example having two UE NES Assistance states is described for convenience of explanation. Referring to FIG. 13, the UE NES Assistance states may be divided into a first UE NES Assistance state 1310 and a second UE NES Assistance state 1320. The first UE NES Assistance state refers to a state in which a UE requests high-speed data transmission, and in this case, the base station is desirable to maintain the NES ON state. The second UE NES Assistance state refers to a state in which a UE does not request high-speed data transmission, and in this case, it may be expected that a short-term problem does not occur to the UE even if the base station maintains the NES OFF state. In an embodiment, transmission of the NES UE Assistance message may occur when the UE NES Assistance state has changed. For another example, a UE NES Assistance message is periodically transmitted, and here, which state the UE NES Assistance state of the UE is in may be notified of together therewith. In the second UE NES Assistance state of the UE, when a data rate required at the MAC device or PDCP layer of the UE is equal to or greater than a first threshold value (or exceeds a first threshold value in an embodiment), the UE may transition to the first UE NES Assistance state (indicated by reference numeral 1330). Here, transmission of a NES UE Assistance message is triggered, and the UE may transmit this triggered message to the base station. Conversely, in the first UE NES Assistance state of the UE, when a data rate required at the MAC device or PDCP layer of the UE is equal to or less than the second threshold value (or below the second threshold in an embodiment), the UE may transition to the second UE NES Assistance state (indicated by reference numeral 1340). Here, transmission of the NES UE Assistance message is triggered, and the UE may transmit this triggered message to the base station.

In an embodiment, the first threshold and the second threshold may be configured to be the same value, or, as in the embodiment of FIG. 13, the first threshold and the second threshold may be configured to be different values. For example, the first threshold may be configured to be a value equal to or smaller than the second threshold to adjust the frequency by which the UE NES Assistance state transitions.

In an embodiment, the condition of operation 1330 may be referred to as a condition for entering the first UE NES Assistance state, and the condition of operation 1340 may be referred to as a condition for leaving the first UE NES Assistance state. Conversely, the condition of operation 1330 may be referred to as a condition for leaving the second UE NES Assistance state, and the condition of operation 1340 may be referred to as a condition for entering the second UE NES Assistance state.

In an embodiment, the UE may transmit the UE NES Assistance message in the first UE NES Assistance state. In another embodiment, the UE may transmit the UE NES Assistance message in the second UE NES Assistance state.

Figure 14:
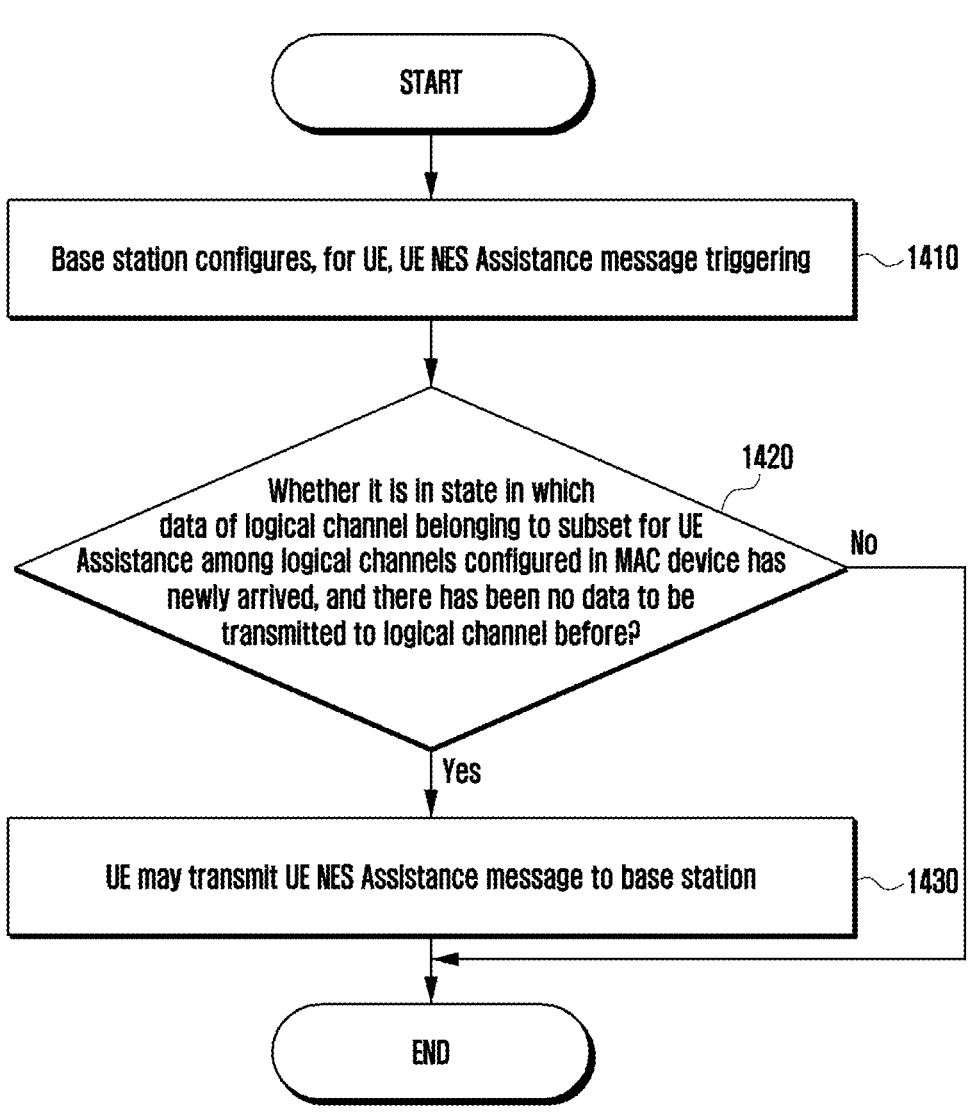
FIG. 14 illustrates an operation of a UE for triggering a UE NES Assistance message according to an embodiment of the disclosure.

FIG. 14 illustrates an operation of a UE for triggering a UE NES Assistance message according to an embodiment of the disclosure.

In the embodiment of FIG. 14, a method in which a UE triggers a UE NES Assistance message by using data of a specific logical channel arrived at a MAC device of the UE is discussed. The UE may know which logical channel data the MAC device of the UE currently has and which logical channel data has newly arrived. In an embodiment, the presence or absence of such logical channel data and arrival conditions thereof may be used to trigger the UE NES Assistance message. However, in an embodiment, the presence or absence of radio bearer data of a PDCP layer and arrival conditions thereof, rather than the presence or absence of logical channel data of the MAC device and arrival conditions thereof, may be used for triggering the UE NES Assistance message.

Referring to FIG. 14, it may be assumed that the base station configures, for the UE, UE NES Assistance message triggering in operation 1410. Operation 1410 of FIG. 14 may be understood as performing operation 221 of FIG. 2 or operation 321 of FIG. 3 in which a base station transmits a UE NES Assistance triggering condition configuration message to the UE. When the triggering condition of the UE NES Assistance message is configured, logical channel information for triggering the UE NES Assistance message (in another embodiment, radio bearer information for triggering the UE NES Assistance message) may be configured. Such a logical channel may be referred to as a subset of logical channels for UE NES Assistance (in another embodiment, the logical channel may be referred to as a subset of radio bearers triggering a UE NES Assistance message).

In operation 1420, the UE may identify whether it is in a state in which logical channel data belonging to a logical channel that triggers UE NES Assistance (a logical channel belonging to a subset for UE NES Assistance), among logical channels configured in the MAC device, has newly arrived and there has been no data to be transmitted to the logical channel before. In addition, the UE may identify whether the priority of the newly arrived logical channel data is higher than the priority of the existing data remaining in the MAC device of the UE. In another embodiment, the UE may identify whether the condition of operation 1420 corresponds to a state in which data of a radio bearer (a radio bearer belonging to a subset for UE NES Assistance) triggering UE NES Assistance, among radio bearers (part or all of DRB, SRB, SLRB, and MRB) configured in the UE, has newly arrived and there has been no data to be transmitted to the radio bearer before. In addition, the UE may also identify whether the priority of the newly arrived radio bearer is higher than the priority of the existing data remaining in the UE. As the priority of data used in the example of FIG. 14, the priority of the logical channel of the corresponding data may be used.

In case that the condition of operation 1420 is satisfied, the UE may transmit a UE NES Assistance message to a base station in operation 1430. A subset for UE NES Assistance may be a logical channel through which the base station should provide a fast or high-speed service to the UE instead of performing an operation to reduce power consumption. To this end, the UE NES Assistance message may include information on a logical channel (or a logical channel group) of data to be transmitted and currently possessed by the UE or information on the quantity of data (data volume) possessed by the corresponding logical channel (or logical channel group).

In an embodiment, the UE NES Assistance message may be configured in the format of a buffer status report message. In this case, satisfying the condition of operation 1420 may result in a condition for triggering a buffer status report message.

Figure 15:
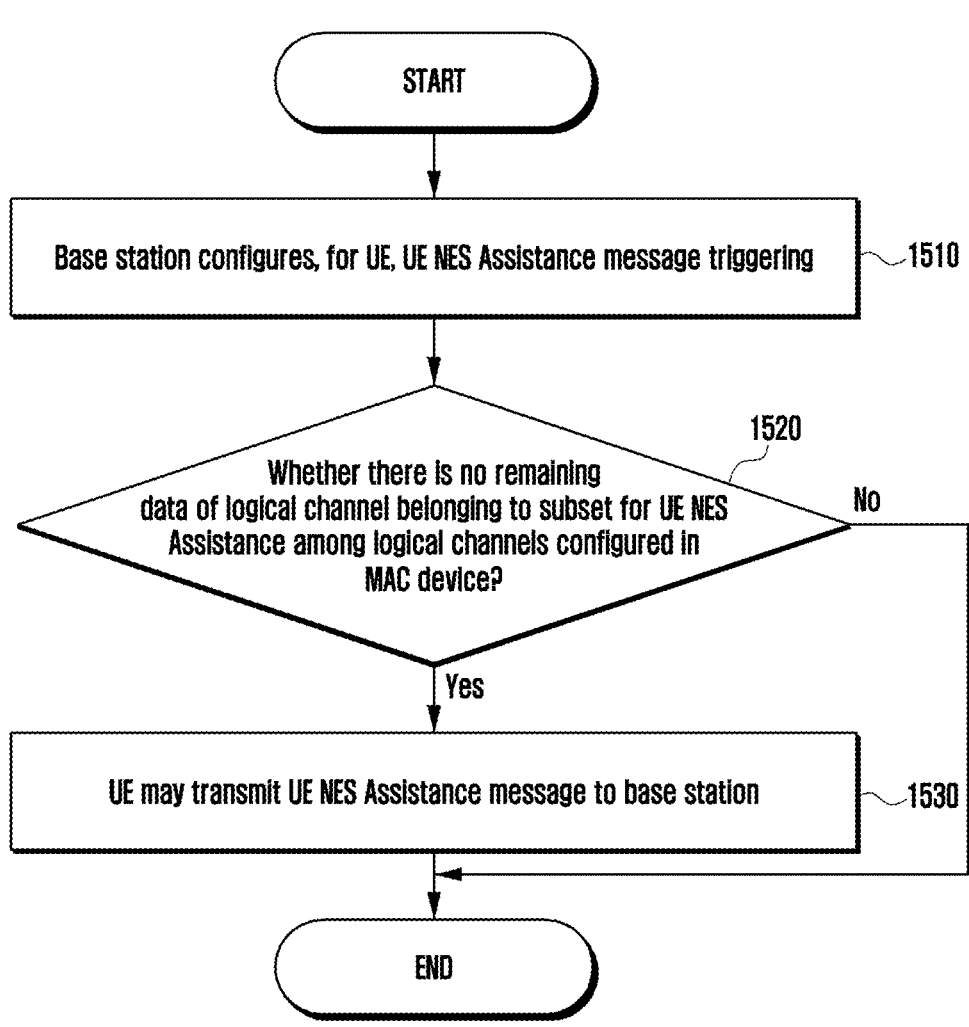
FIG. 15 illustrates an operation of a UE for triggering a UE NES Assistance message according to an embodiment of the disclosure.

FIG. 15 illustrates an operation of a UE for triggering a UE NES Assistance message according to an embodiment of the disclosure.

In the embodiment of FIG. 15, a method in which a UE triggers a UE NES Assistance message by using data of a specific logical channel arrived at a MAC device of the UE is discussed. The UE may know which logical channel data the MAC device of the UE currently has and which logical channel data has been transmitted, and thus how much data is left. In an embodiment, the presence or absence of such logical channel data and arrival conditions thereof may be used to trigger the UE NES Assistance message. However, in another embodiment, the presence or absence of radio bearer data of a PDCP layer and arrival conditions thereof, rather than the presence or absence of logical channel data of the MAC device and arrival conditions thereof, may be used for triggering the UE NES Assistance message.

Referring to FIG. 15, it may be assumed that the base station configures, for the UE, UE NES Assistance message triggering in operation 1510. Operation 1510 of FIG. 15 may be understood as performing operation 221 of FIG. 2 or operation 321 of FIG. 3 in which a base station transmits a UE NES Assistance triggering condition configuration message to the UE. When the triggering condition of the UE NES Assistance message is configured, logical channel information for triggering the UE NES Assistance message (in another embodiment, radio bearer information for triggering the UE NES Assistance message) may be configured. Such a logical channel may be referred to as a subset of logical channels for UE NES Assistance (in another embodiment, the logical channel may be referred to as a subset of radio bearers triggering a UE NES Assistance message).

In operation 1520, the UE may identify whether all the data belonging to logical channels that trigger UE NES Assistance (a logical channel belonging to a subset for UE NES Assistance) among the logical channels configured in the MAC device have been transmitted and there is no data remaining. In another embodiment, the UE may be configured to identify whether the condition of operation 1520 corresponds to a state in which there is no remaining data of a radio bearer triggering UE NES Assistance (a radio bearer belonging to a subset for UE NES Assistance) among radio bearers (part or all of DRB, SRB, SLRB, and MRB) configured in the UE. As the priority of data used in the example of FIG. 15, the priority of the logical channel of the corresponding data may be used.

In case that the condition of operation 1520 is satisfied, the UE may transmit a UE NES Assistance message to a base station in operation 1530. A subset for UE NES Assistance may be a logical channel through which the base station should provide a fast or high-speed service to the UE instead of performing an operation to reduce power consumption. To this end, the UE NES Assistance message may include information on a logical channel (or a logical channel group) of data to be transmitted and currently possessed by the UE or information on the quantity of data (data volume) possessed by the corresponding logical channel (or logical channel group). In an embodiment, the UE NES Assistance message may be configured in the format of a buffer status report message. In this case, satisfying the condition of operation 1520 may result in a condition for triggering a buffer status report message.

Figure 16:
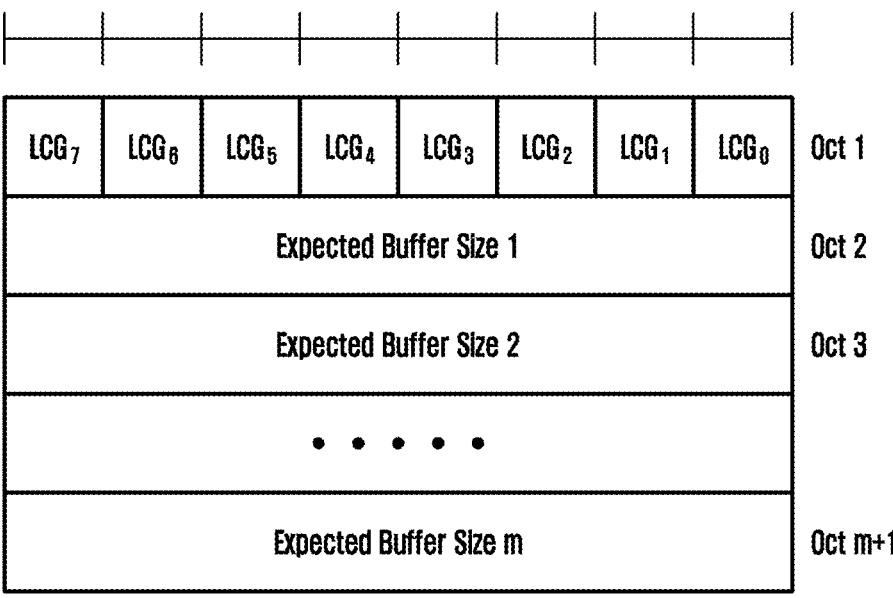
FIG. 16 illustrates a format of an expected buffer status report message of a UE according to an embodiment of the disclosure.

FIG. 16 illustrates a format of an expected buffer status report message of a UE according to an embodiment of the disclosure.

As described above, the NES UE Assistance message may include information on data volume for each logical channel group that is expected to occur in a predetermined near future for a UE. Here, the NES UE Assistance message may have the format of a buffer status report message, and the buffer size field may include data volume (buffer size) for each logical channel group expected to occur in a predetermined near future, rather than the current buffer size for each logical channel group. Such a message may be referred to as an expected buffer status report (or predicted buffer status report) message.

FIG. 16 illustrates an embodiment of the format of an expected buffer status report message. The expected buffer status report message may include an LCGi field indicating whether an expected buffer size is greater than 0 in units of logical channel groups (LCGs) and an expected buffer size i field indicating an expected data volume for the UE. In case that a data volume expected to occur in a predetermined near future for LCGi (i=0,1,2,3,4,5,6,7) (a logical channel group having logical channel group index of i) is greater than 0, the LCGi field may be configured to be 1. Otherwise, in case that a data volume expected to occur in a predetermined near future is 0, the LCGi field may be configured to be 0. This may have the same meaning as the configuration such that when the data volume expected to occur in a predetermined near future is greater than 0, the expected buffer size field of the logical channel group is included and thus the LCGi field of the logical channel group through which the expected buffer size field is reported is configured to be 1, and otherwise, the LCGi field is configured to be 0. In the case of the expected buffer size i field, an expected data volume value of a logical channel group having a logical channel group index of i may be included.

In the embodiment of FIG. 16, a predetermined period of time for calculation of the expected data volume may be configured by the base station or may be pre-configured. The UE may transmit a UE NES Assistance message to the base station based on the expected data volume. When the UE NES Assistance message includes the expected data volume value, the UE may include a value, obtained by quantifying the expectation accuracy of the expected data volume of the UE, in the UE NES Assistance message, and the base station may operate the NES mode based on the expectation accuracy.

Figure 17:
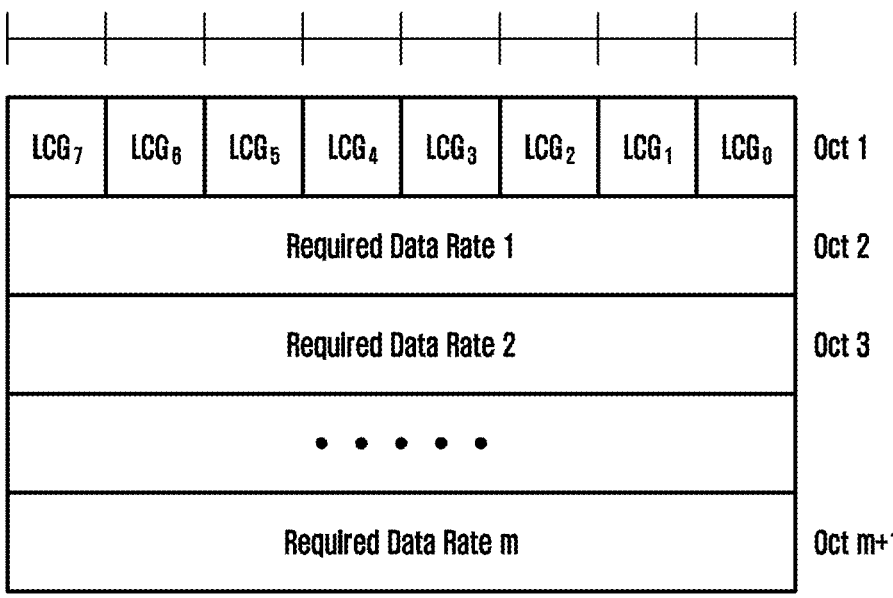
FIG. 17 illustrates a format of a request data rate report message of a UE according to an embodiment of the disclosure.

FIG. 17 illustrates a format of a required data rate report message of a UE according to an embodiment of the disclosure.

As described above, the NES UE Assistance message may include a data rate for each logical channel group required in a predetermined near future for a UE. Here, the NES UE Assistance message may have the format of a buffer status report message, and the buffer size field of the buffer status report may include a data rate for each logical channel group that is required in a predetermined near future, rather than the current buffer size for each logical channel group. Such a message may be referred to as a required data rate report message. FIG. 17 illustrates an embodiment of the format of a required data rate report message. The required data rate report message may include an LCGi field indicating whether a data rate required in units of logical channel groups is greater than 0, and a required data rate field indicating a data rate required by the UE. In case that a data rate expected to occur in a predetermined near future for LCGi (i=0,1,2,3,4,5,6,7) (a logical channel group having logical channel group index of i) is greater than 0, the LCGi field may be configured to be 1. Otherwise, in case that a data rate expected to occur in a predetermined near future is 0, the LCGi field may be configured to be 0. This may have the same meaning as the configuration such that when the data rate expected to occur in a predetermined near future is greater than 0, the required data rate field of the logical channel group is included and thus the LCGi field of the logical channel group through which the required data rate field is reported is configured to be 1, and otherwise, the LCGi field is configured to be 0. In the case of the required data rate i field, a required data rate value of a logical channel group having a logical channel group index of i may be included.

In the embodiment of FIG. 17, a predetermined period of time for calculation of the required data rate may be configured by the base station or may be pre-configured. The UE may transmit a UE NES Assistance message to the base station based on the required data rate for each logical channel. When the UE NES Assistance message includes the required data rate value, the UE may include a value, obtained by quantifying the accuracy of the required data rate of the UE, in the UE NES Assistance message, and the base station operates the NES mode based on this accuracy.

Figure 18:
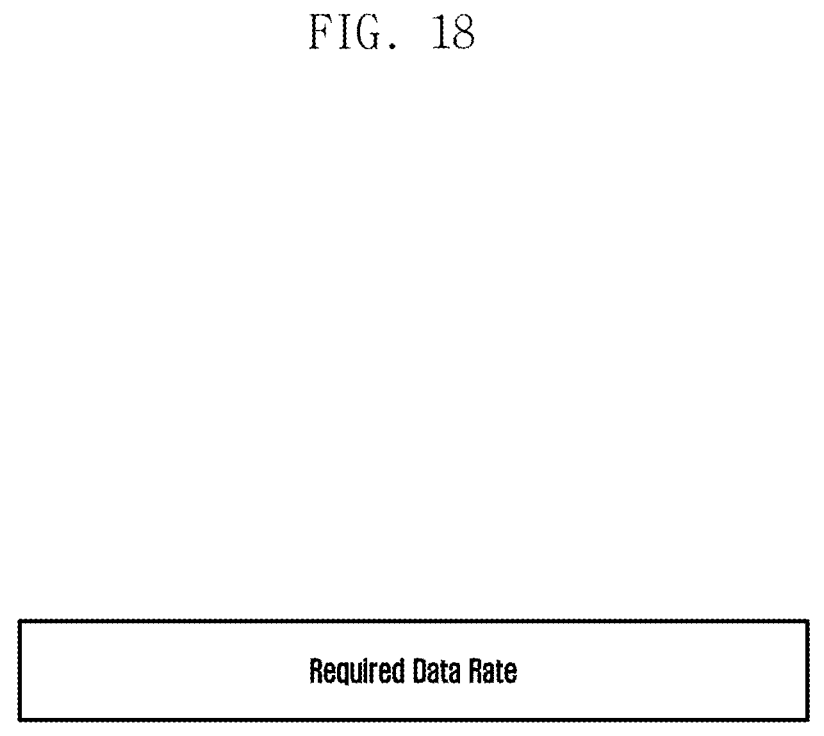

FIG. 18 illustrates a format of a request data rate report message of a UE according to an embodiment of the disclosure.

As described above, the NES UE Assistance message may include a data rate required in a predetermined near future for a UE. Such a message may be referred to as a required data rate report message. FIG. 18 illustrates an embodiment of the format of a request data rate report message. The required data rate report message may include a required data rate field indicating a required data rate for a UE. In an embodiment, a data rate included in the required data rate field may correspond to a rate for transmitting data of a logical channel that triggers UE NES Assistance (a logical channel belonging to a subset for UE NES Assistance) among logical channels configured in the MAC device. In another embodiment, a data rate included in the required data rate field may correspond to a rate for transmitting data of a radio bearer that triggers UE NES Assistance (a radio bearer belonging to a subset for UE NES Assistance) among the radio bearers (part or all of DRB, SRB, SLRB, and MRB) configured in a UE.

In the embodiment of FIG. 18, a predetermined period of time for calculation of the required data rate may be configured by a base station or may be pre-configured. Based on the required data rate for each logical channel of a UE, the UE may transmit a UE NES Assistance message to the base station. When the UE NES Assistance message includes a required data rate value, the UE may include a value, obtained by quantifying the accuracy of the required data rate, in the UE NES Assistance message, and the base station may operate the NES mode based on this accuracy.

Figure 19:
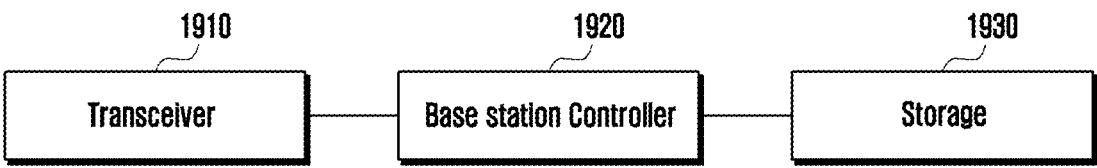
FIG. 19 illustrates the structure of a base station according to an embodiment of the disclosure.

FIG. 19 illustrates a structure of a base station (BS) according to an embodiment of the disclosure.

Referring to FIG. 19, the BS may include a transceiver 1910, a controller 1920, and a storage 1930. In the disclosure, the controller 1920 may be defined as a circuit, an application specific integrated circuit or at least one processor. The transceiver 1910 may transmit and receive a signal to/from other network entity. For example, The transceiver 1910 may transmit system information to the UE and transmit a synchronization signal or a reference signal. The controller 1920 may control overall operations of the BS according to the embodiments of the disclosure. For example, The controller 1920 may control signal flows between blocks to perform an operation according to a flowchart described above. The storage 1930 may store at least one of information transmitted and received via the transceiver 1910 and information generated via the controller 1920.

Figure 20:
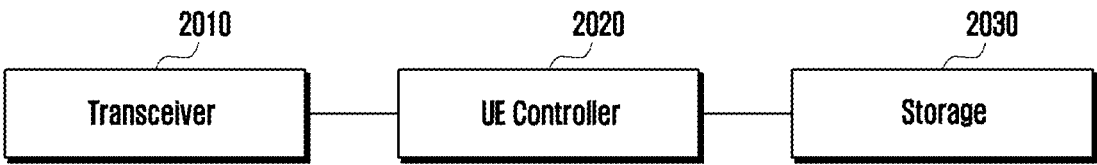
FIG. 20 illustrates the structure of a UE according to an embodiment of the disclosure.

FIG. 20 illustrates a structure of a UE according to an embodiment of the disclosure.

Referring to FIG. 20, the UE may include a transceiver 2010, a controller 2020, and a storage 2030. In the disclosure, the controller 2020 may be defined as a circuit, an application specific integrated circuit or at least one processor. The transceiver 2010 may transmit and receive a signal to/from other network entity. For example, The transceiver 2010 may receive system information from the BS and receive a synchronization signal or a reference signal. The controller 2020 may control overall operations of the UE according to the embodiments of the disclosure. For example, The controller 2020 may control signal flows between blocks to perform an operation according to a flowchart described above. The storage 2030 may store at least one of information transmitted and received via the transceiver 2010 and information generated via the controller 2020.

In the drawings in which methods of the disclosure are described, the order of the description does not always correspond to the order in which steps of each method are performed, and the order or relationship between the steps may be changed or the steps may be performed in parallel.

Alternatively, in the drawings in which methods of the disclosure are described, some elements may be omitted and only some elements may be included therein without departing from the scope of the disclosure.

Further, in methods of the disclosure, some or all of the contents of each embodiment may be combined without departing from the scope of the disclosure.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a first message associated with triggering a transmission of a second message;
   identifying whether the transmission of the second message associated with network energy saving is triggered based on the first message;
   transmitting, to the base station, the second message associated with network energy saving, in case that the transmission of the second message is triggered; and
   receiving, from the base station, a third message associated with a network energy status of the base station configured based on the second message.

2. The method of claim 1, wherein the first message includes at least one of information on a condition for the triggering, information on a threshold associated with the triggering, or information on a periodicity for the transmission of the second message.

3. The method of claim 2, wherein the first message further includes a configuration for at least one logical channel associated with the triggering or a configuration for at least one radio bearer associated with the triggering.

4. The method of claim 1, wherein the second message includes at least one of information on a data volume of the terminal, information on an expected data volume of the terminal, information on an expected data rate, or information on a status of a data arrival.

5. The method of claim 1, further comprising:

identifying whether a data volume of at least one logical channel associated with the triggering is greater than or equal to a threshold; and identifying that the transmission of the second message is triggered in case that the data volume is greater than or equal to the threshold.

6. The method of claim 1, wherein the second message includes a first field indicating whether an expected buffer size of a logical channel group is greater than 0, and a second field indicating information on the expected buffer size corresponding to an index of the logical channel group.

7. The method of claim 1, wherein the second message includes a first field indicating whether a required data rate associated with a logical channel group is greater than 0, and a second field indicating information on the required data rate corresponding to an index of the logical channel group.

8. A method performed by a base station in a wireless communication system, the method comprising:

transmitting, to a terminal, a first message associated with triggering a transmission of a second message;

receiving, from the terminal, the second message associated with network energy saving, in case that the transmission of the second message is triggered based on the first message;

controlling a network energy status of the base station based on the second message; and transmitting, to the terminal, a third message associated with the network energy status.

9. The method of claim 8, wherein controlling the network energy status of the base station comprises:

identifying that a data volume of the terminal is less than a threshold, based on the second message; and changing the network energy status of the base station from "on" to "off".

10. The method of claim 8, wherein the first message includes at least one of information on a condition for the triggering, information on a threshold associated with the triggering, or information on a periodicity for the transmission of the second message, and wherein the second message includes at least one of information on a data volume of the terminal, information on an expected data volume of the terminal, information on an expected data rate, or information on a status of a data arrival.

11. The method of claim 8, wherein the second message includes a first field indicating whether an expected buffer size of a logical channel group is greater than 0, and a second field indicating information on the expected buffer size corresponding to an index of the logical channel group.

12. The method of claim 8, wherein the second message includes a first field indicating whether a required data rate associated with a logical channel group is greater than 0, and a second field indicating information on the required data rate corresponding to an index of the logical channel group.

13. A terminal in a wireless communication system, the terminal comprising:

a transceiver; and a controller coupled with the transceiver and configured to:

receive, from a base station, a first message associated with triggering a transmission of a second message, identify whether the transmission of the second message associated with network energy saving is triggered based on the first message, transmit, to the base station, the second message associated with network energy saving, in case that the transmission of the second message is triggered, and receive, from the base station, a third message associated with a network energy status of the base station configured based on the second message.

14. The terminal of claim 13, wherein the first message includes at least one of information on a condition for the triggering, information on a threshold associated with the triggering, or information on a periodicity for the transmission of the second message.

15. The terminal of claim 13, wherein the second message includes at least one of information on a data volume of the terminal, information on an expected data volume of the terminal, information on an expected data rate, or information on a status of a data arrival.

16. The terminal of claim 13, wherein the controller is further configured to:

identify whether a data volume of at least one logical channel associated with the triggering is greater than or equal to a threshold, and identify that the transmission of the second message is triggered in case that the data volume is greater than or equal to the threshold.

17. A base station in a wireless communication system, the base station comprising:

a transceiver; and a controller coupled with the transceiver and configured to:

transmit, to a terminal, a first message associated with triggering a transmission of a second message, receive, from the terminal, the second message associated with network energy saving, in case that the transmission of the second message is triggered based on the first message, control a network energy status of the base station based on the second message, and transmit, to the terminal, a third message associated with the network energy status.

18. The base station of claim 17, wherein for controlling the network energy status of the base station, the controller is configured to:

identify that a data volume of the terminal is less than a threshold, based on the second message, and change the network energy status of the base station from "on" to "off".

19. The base station of claim 17, wherein the first message includes at least one of information on a condition for the triggering, information on a threshold associated with the triggering, or information on a periodicity for the transmission of the second message, and wherein the second message includes at least one of information on a data volume of the terminal, information on an expected data volume of the terminal, information on an expected data rate, or information on a status of a data arrival.

20. The base station of claim 17, wherein the second message includes a first field indicating whether an expected buffer size of a logical channel group is greater than 0, and a second field indicating information on the expected buffer size corresponding to an index of the logical channel group.

* * * * *